(12) United States Patent
Saeda et al.

(10) Patent No.: US 11,743,399 B2
(45) Date of Patent: Aug. 29, 2023

(54) IMAGE FORMING APPARATUS OPERATION SETTING METHOD

(71) Applicant: SHARP KABUSHIKI KAISHA, Osaka (JP)

(72) Inventors: Masao Saeda, Osaka (JP); Yasuhiro Nakai, Osaka (JP); Kohichi Murakami, Osaka (JP); Yasutomo Hayano, Osaka (JP); Emiko Matsuo, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/696,600

(22) Filed: Mar. 16, 2022

(65) Prior Publication Data
US 2022/0311882 A1    Sep. 29, 2022

(30) Foreign Application Priority Data

Mar. 24, 2021   (JP) ................. 2021-049633

(51) Int. Cl.
*H04N 1/00* (2006.01)
(52) U.S. Cl.
CPC ..... *H04N 1/00344* (2013.01); *H04N 1/00307* (2013.01); *H04N 1/00973* (2013.01); *H04N 2201/0094* (2013.01)
(58) Field of Classification Search
CPC .... G06F 40/279; G06F 16/3329; G06F 40/30; G06F 16/2425; G06F 16/90332; G06F 16/9035; G06F 16/906; G06F 3/14; G06F 40/166; G06F 40/40; G06F 13/00; G06F 16/3349; G06F 21/32; G06F 21/62; G06F 3/0412; G06F 3/16; G06F 40/20; G06F 40/205; G06F 40/216; G06F 40/268; G06F 40/289; G06F 40/295; G06F 40/35; G06F 40/56; H04N 2201/0094; H04N 1/00244; H04N 1/00344; H04N 1/00307; H04N 1/00281; H04N 1/00352; H04N 1/00474; H04N 1/00482; H04N 1/0097; H04N 1/00973; H04N 7/14; H04N 7/141; G10L 15/22; G10L 15/1822; G10L 2015/223; G10L 15/16; G10L 15/183; H04L 51/02;
(Continued)

(56) References Cited

U.S. PATENT DOCUMENTS 6,463,463 B1 * 10/2002 Godfrey .................. H04L 67/04
340/7.29
11,394,828 B2 * 7/2022 Saeda .................... H04M 3/523
(Continued)

FOREIGN PATENT DOCUMENTS

JP      2019-191958 A    10/2019

*Primary Examiner* — Negussie Worku
(74) *Attorney, Agent, or Firm* — ScienBiziP, P.C.

(57) ABSTRACT

An image processing system is provided with an image forming apparatus and a mobile terminal, and a chatbot is formed of a server (and a call center terminal). A user asks the server or an operator at the call center terminal a question by means of the chatbot; answer data is returned to the mobile terminal from the server or from the call center terminal by the operator; operation setting data accompanying the answer text is transmitted from the mobile terminal to the image forming apparatus; and the transmitted operation setting data is set as the operation setting data in the image forming apparatus.

5 Claims, 15 Drawing Sheets

(58) Field of Classification Search
CPC ..... H04L 51/043; H04L 51/046; H04L 51/10; H04L 51/58; H04L 67/55; G06N 3/0454; G06N 3/08; G06N 5/04; G06N 20/00; G06N 3/04; G06Q 50/30; G06Q 30/0281; G06Q 10/063112; G06Q 2220/10; G06Q 30/0631; G06Q 50/22; G06Q 50/26; H04M 2203/357; H04M 3/5166; H04M 3/5183; H04M 3/523; H04M 2203/205; H04M 2203/2072; H04M 2203/551; H04M 3/42365; H04M 3/42382; H04M 3/436; H04M 3/4872; H04M 3/4878; H04W 4/12; H04W 88/02; H04W 4/23; G06K 7/10544; G06K 9/6201; G06K 9/6267; G06T 19/003; G06T 2207/20084; G06T 7/0004; G06V 10/40; G06V 10/764; G06V 10/774; G06V 10/82; G06V 30/40; G07F 17/42; G07F 7/08; G16H 10/20; G16H 10/60; G16H 20/70; G16H 50/20; G16H 50/30; G16H 50/70; G16H 80/00

USPC .................................................... 358/1.15
See application file for complete search history.

(56) References Cited

U.S. PATENT DOCUMENTS

| | | | |
|---|---|---|---|
| 11,647,127 B2* | 5/2023 | Saeda | H04N 1/00474 |
| | | | 358/1.15 |
| 2013/0238601 A1* | 9/2013 | Kanemoto | G06F 16/9535 |
| | | | 707/722 |
| 2015/0301768 A1* | 10/2015 | Nishiyama | G06F 3/1257 |
| | | | 358/1.15 |
| 2019/0317709 A1* | 10/2019 | Sugimoto | G06F 3/1204 |
| 2019/0327380 A1* | 10/2019 | Oyoshi | H04N 1/00307 |
| 2019/0369924 A1* | 12/2019 | Oka | H04L 51/02 |
| 2020/0133592 A1* | 4/2020 | Mitsuhashi | G06F 3/1226 |
| 2020/0304437 A1* | 9/2020 | Sasamae | H04L 51/02 |
| 2022/0109762 A1* | 4/2022 | Saeda | H04N 1/00307 |
| 2022/0124199 A1* | 4/2022 | Saeda | H04M 3/523 |
| 2022/0229613 A1* | 7/2022 | Sugimoto | G06F 3/1257 |

* cited by examiner

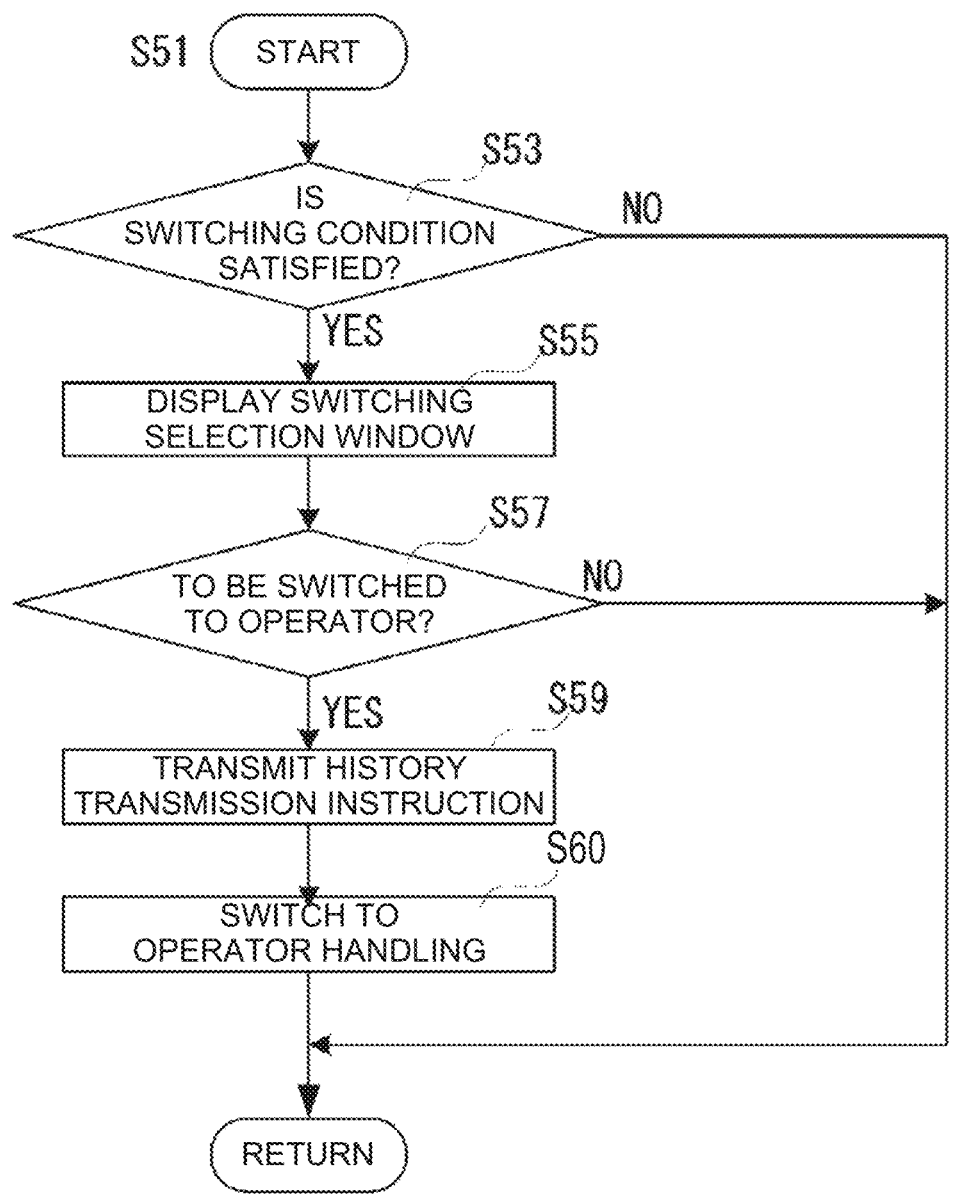

IMAGE FORMING APPARATUS OPERATION SETTING METHOD

BACKGROUND OF THE INVENTION

Field of the Invention

The present invention relates to an operation method for an image forming apparatus, and more particularly, to an operation method for an image forming apparatus in which a chatbot is used to assist a user, for example.

DESCRIPTION OF THE BACKGROUND ART

Japanese Unexamined Patent Application Publication No. 2019-191958 discloses an example of the background art in this field. A message service system of the background art includes a user terminal for use by a user and a chat service server, and the user operates the user terminal to access the chat service server on a cloud, exchanges messages with a chatbot, and causes the chatbot to execute a service such as a print service.

In a user support service that uses a chatbot as in the background art, while the user can be advised of the operation setting through the chatbot, there has been a problem that it is troublesome for the user to operate an image forming apparatus again in order to execute a job.

In view of the foregoing, the main object of the present invention is to provide a novel image forming apparatus operation setting method.

Another object of the present invention is to provide an image forming apparatus operation setting method which enables the trouble for the user to be reduced as much as possible, in a user support service that uses a chatbot.

SUMMARY OF THE INVENTION

The present invention pertains to an image forming apparatus operation setting method in which a user accesses a chatbot from a mobile terminal to ask a question about an operation method for an image forming apparatus, and the image forming apparatus operation setting method includes: a receiving step of receiving an answer to the question, which is transmitted from the chatbot, by the mobile terminal; a transmission step of transmitting, to the image forming apparatus, operation setting data accompanying the answer received from the mobile terminal; and an operation setting step of registering the operation setting data transmitted from the mobile terminal in the image forming apparatus.

According to a first mode of an embodiment, since the operation setting necessary for execution of a job in the image forming apparatus is carried out by the chatbot, the trouble for the user can be reduced as much as possible.

According to a second mode of an embodiment, since the operation setting data set by the user can be set preferentially, the user's intention can be easily reflected in the job.

According to a third mode of an embodiment, if there exists duplication between the operation setting data received from the mobile terminal through the chatbot and the operation setting data originally set by the user, the user is prompted to make a selection of the data. For this reason, the operation setting data set by the user can be set preferentially, and the user's intention can be easily reflected in the job.

According to a fourth mode of an embodiment, since the user is informed of unset items, and the user is prompted to set the unset items if necessary, the job can be executed without fail.

According to a fifth mode of an embodiment, since unset portions are displayed on the mobile terminal, the embodiment brings about an advantage of realizing more easily viewable display for the user than performing the display on a display of the image forming apparatus.

According to the present invention, in a user support service that uses a chatbot, since the operation setting necessary for execution of the job in the image forming apparatus is carried out by the chatbot, the trouble for the user can be reduced as much as possible.

The above objects and other objects, features, and advantages of the present invention will be clearer from the detailed description of the embodiments given below with reference to the accompanying drawings.

BRIEF DESCRIPTION OF THE DRAWINGS

FIG. 17 is a flowchart showing an example of the operation of establishing a chat with an operator at a call center terminal in the embodiment of FIG. 16.

DESCRIPTION OF THE PREFERRED EMBODIMENTS

First Embodiment

Figure 1:
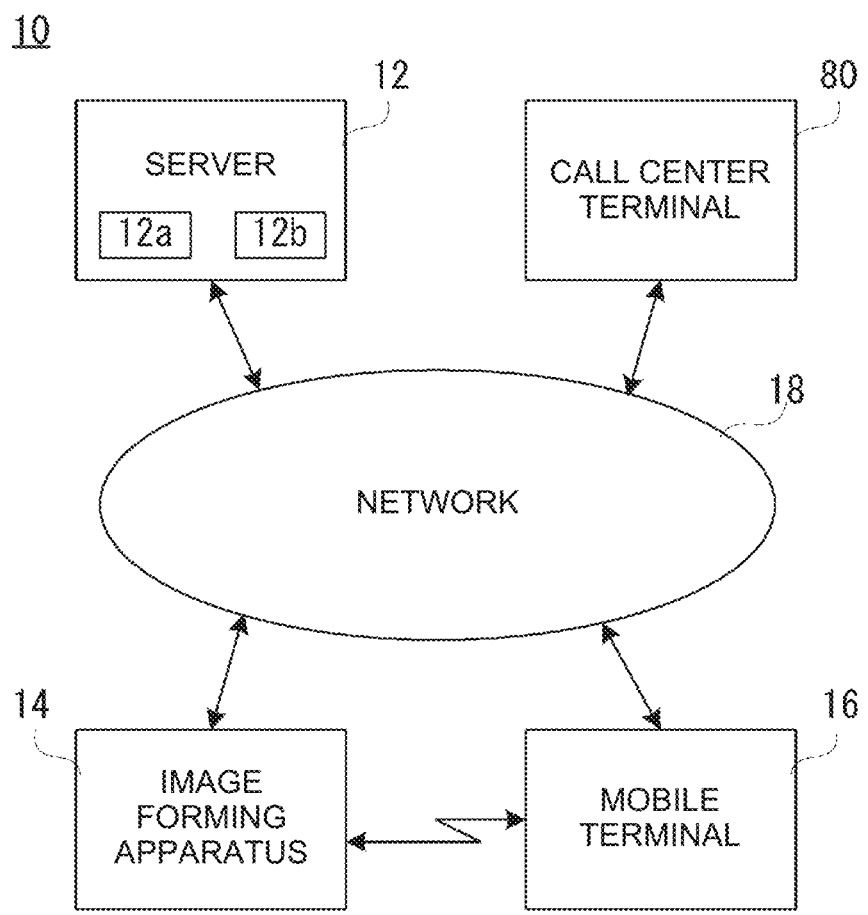
FIG. 1 is an illustrative view showing a configuration of an image processing system which corresponds to one embodiment of the present invention.

With reference to FIG. 1, an image processing system 10 according to a first embodiment of the present invention includes a server (an information processing device) 12, an image forming apparatus 14, a mobile terminal 16, and a call center terminal 80. The server 12 is communicably connected to the image forming apparatus 14, the mobile terminal 16, and the call center terminal 80 via a network 18 such as the Internet or a LAN.

The server 12 is a general-purpose server which executes a chatbot, and includes components such as a CPU 12a, a RAM 12b, and a communication module. Also, the server 12 includes a storage constituted of a non-volatile memory such as an HDD, a flash memory, or an EEPROM, or a semiconductor memory such as an SSD.

The image forming apparatus 14 is a multifunction peripheral (MFP) having functions such as a copier (copy) function, a printer function, a scanner function, and a facsimile (fax) function. In the present embodiment, the image forming apparatus 14 is installed in a public space, and used by an unspecified number of people (users). As the public space, stores such as a supermarket, a restaurant or a convenience store, or public facilities such as a station, a bus terminal, an airport, a public office, or a library are assumed.

Note that the call center terminal 80 is a general-purpose computer (terminal) used by an operator at a call center to answer a question when a problem cannot be resolved only from the question and an answer provided by a chatbot, and corresponds to, for example, a desktop PC, a notebook (laptop) PC, and a tablet PC. Though not illustrated, the call center terminal 80 as described above includes a keyboard and a mouse as input devices, and a display or the like as an output device.

Figure 2:
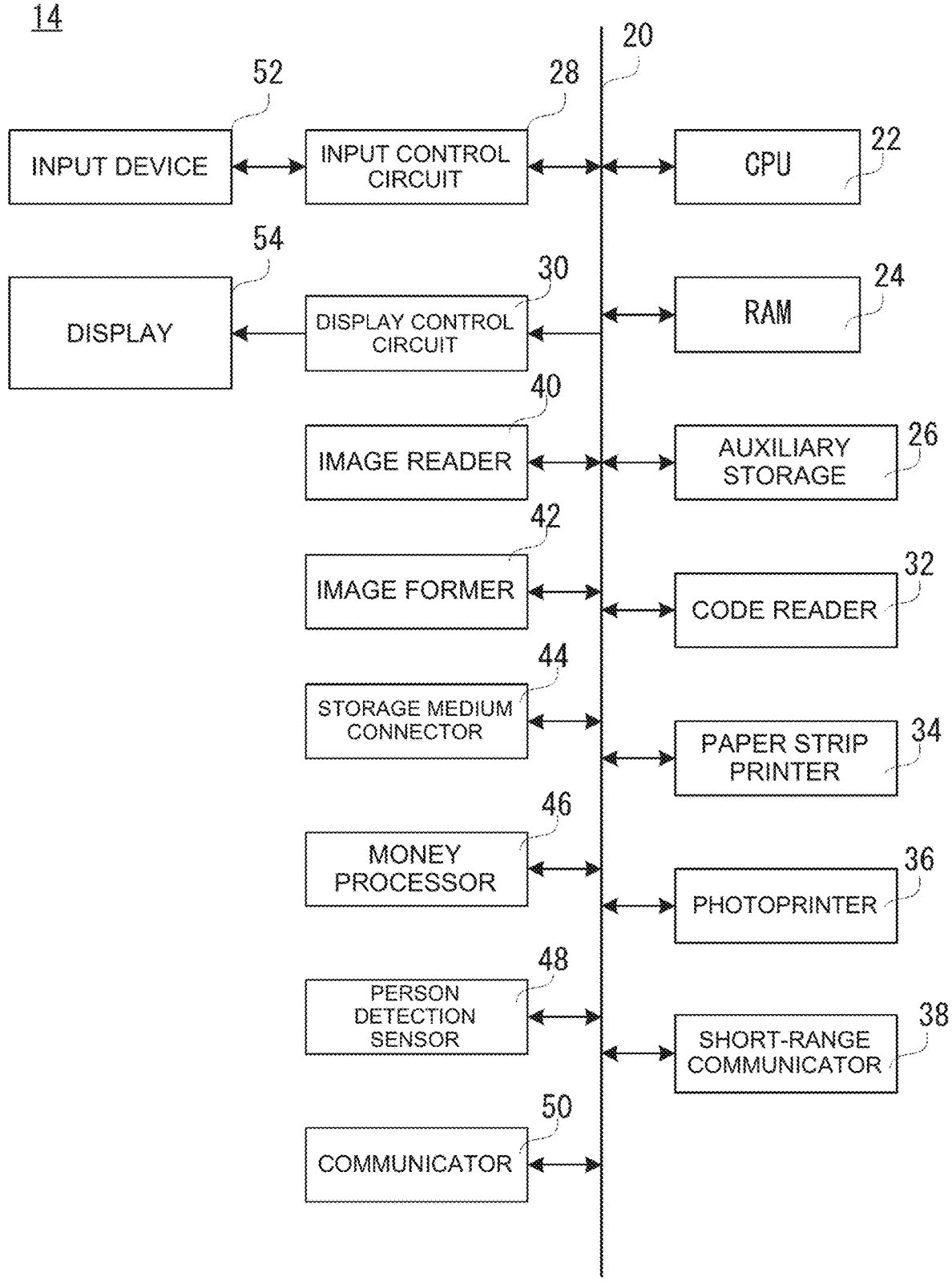
FIG. 2 is a block diagram illustrating an electrical configuration of an image forming apparatus illustrated in FIG. 1.

FIG. 2 is a block diagram illustrating an electrical configuration of the image forming apparatus 14 illustrated in FIG. 1. With reference to FIG. 2, the image forming apparatus 14 includes a CPU 22. To the CPU 22, a RAM 24, an auxiliary storage 26, an input control circuit 28, a display control circuit 30, a code reader 32, a paper strip printer 34, a photoprinter 36, a short-range communicator 38, an image reader 40, an image former 42, a storage medium connector 44, a money processor 46, a person detection sensor 48, and a communicator 50 are coupled via a bus 20. Also, an input device 52 is coupled to the input control circuit 28, and a display 54 is coupled to the display control circuit 30.

The CPU 22 manages the overall control of the image forming apparatus 14. The RAM 24 is a primary storage of the CPU 22, and is used as a work area and a buffer area.

The auxiliary storage 26 is an auxiliary storage device of the image forming apparatus 14 to store a control program for controlling the operation of each component of the image forming apparatus 14 by the CPU 22, and various kinds of data or the like. In this regard, a memory such as an HDD is used as the auxiliary storage 26. The same applies to an auxiliary storage 66 and an auxiliary storage 86 to be described later.

The input device 52 is a device for receiving an input operation by a user (i.e., a user operation), and includes, for example, a touch panel and a hardware operation button or operation key (i.e., a hardware key). The touch panel is a general-purpose touch panel, and a touch panel of an arbitrary type, such as a capacitive type, an electromagnetic induction type, a resistive type, or an infrared type, can be used. Further, the touch panel may be provided on a display surface of the display 54, or provided separately from the display 54. In this regard, a touch display in which the touch panel is formed integrally with the display 54 may be provided. When the touch panel is provided on the display surface of the display 54, the display 54 presents a graphical user interface (GUI) including a software key such as an icon, and receives a user operation via the GUI.

Note that the software key refers to, for example, a key or an icon reproduced by software on the display surface of the display. Meanwhile, the hardware key refers to a key or a push button provided as a physical device.

The input control circuit 28 outputs, to the CPU 22, an operation signal or operation data corresponding to the operation of the input device 52. For example, the input control circuit 28 applies a necessary voltage and the like to the touch panel included in the input device 52, and also outputs, when a touch operation (a touch input) is performed within a touch effective range of the touch panel, the touch coordinate data indicating the position of the touch input to the CPU 22. Also, the input control circuit 28 outputs, to the CPU 22, an operation signal or operation data corresponding to an operation of the operation button or the hardware key included in the input device 52.

The display control circuit 30 includes a GPU and a VRAM or the like. Under an instruction from the CPU 22, the GPU generates, in the VRAM, display image data for displaying various screens on the display 54 by using image generation data stored in the RAM 24, and outputs the generated display image data to the display 54. An LCD or an EL display, etc., may be used as the display 54.

The code reader 32 includes, for example, a laser scanner or a camera, and is capable of reading a code provided on a commercial product, a card, a receipt, or the like, or a code (a coded image) displayed on a screen of the mobile terminal 16 or the like. The codes that can be read by the code reader 32 include, for example, bar codes (one-dimensional bar codes) and two-dimensional codes (for example, QR codes (registered trademark), Micro QR codes, DataMatrix, Maxi-Code, and VeriCode).

The paper strip printer 34 is, for example, a thermal printer (heat-sensitive printer) or a dot impact printer, and issues a strip of paper having an image printed thereon, such as a receipt, a bill-payment receipt, a journal, or a coupon ticket. Specifically, the paper strip printer 34 prints various character strings, images, code patterns (such as barcodes), etc., on a roll of paper, and discharges the printed paper strip.

The photoprinter 36 is, for example, a dye sublimation printer or an inkjet printer, and prints an image on paper for photo (i.e., photo paper). A photograph printed by the photoprinter 36 is discharged to a photo discharge part provided on a lateral side of the image forming apparatus 14. As image data for forming an image on paper, image data stored in a storage medium coupled to the storage medium connector 44, or image data transmitted from an external computer, etc., is used.

The short-range communicator 38 is, for example, a device which performs contactless data communication wirelessly with a communication target, such as an IC card (an identification card, a membership card, an employee ID card, etc.) or a user terminal, in accordance with the telecommunications standard such as ISO/IEC 18092 (the so-called Near Field Communication [NFC]). A communicable distance of the short-range communicator 38 is approximately from several centimeters to several meters. For example, the short-range communicator 38 transmits, to the communication target, a signal (a read command) instructing that data stored in the communication target should be read. In this case, the communication target transmits the desired data to the short-range communicator 38 as a response to the read command. In addition, the short-range communicator 38 transmits a signal (a write command) instructing that writing should be performed together with data (write data) to be written to the communication target. In this case, the communication target writes (stores) the received write data in a storage of the communication target in accordance with the write command.

The image reader 40 is provided with a light source, a plurality of mirrors, an imaging lens, a line sensor, and the like. The image reader 40 exposes the surface of a document to light by the light source, and guides reflected light, which is reflected from the surface of the document, to the imaging lens by the plurality of mirrors. Then, the reflected light is brought to a light receiving element of the line sensor for image formation by the imaging lens. The line sensor detects the luminance and chromaticity of the reflected light brought to the light receiving element for image formation, and generates read image data based on an image on the surface of the document.

The image former (printer) 42 is a general-purpose laser printer, and is provided with a photoreceptor, a charger, an exposure device, a developing device, a transfer device, a fuser device, and the like, to print an image corresponding to print image data (i.e., a print image) on a recording sheet (paper) or the like. In this regard, the image former 42 is not limited to a laser printer, and may be configured by an inkjet printer.

Although not described in detail, the image former 42 has a color print function, and an image formation station including the photoreceptor, the charger, and the developing device, etc., is constituted for each of the colors of yellow (Y), magenta (M), cyan (C), and black (K).

The storage medium connector 44 includes a mounting part (for example, a drive and a memory slot) for mounting of various types of storage media. For example, the storage media include optical disks (e.g., CD-R, DVD-R, and BD-R) and a flash memory (e.g., a USB memory, an SD memory card, and a memory stick). An optical disk is mounted into the drive, and a flash memory is mounted into the memory slot.

The money processor 46 includes a money insertion part and a coin return slot. The money insertion part includes a coin insertion slot, a bill insertion slot, a change return lever, etc. Coins inserted through the coin insertion slot and bills inserted through the bill insertion slot are classified according to the type of each coin or bill, and are accommodated in a predetermined money storage part. The money storage part includes a storage part for coins and a storage part for bills. When coins or bills are inserted, the amount of money inserted is calculated according to the type and the number of coins accommodated in the storage part for coins, and the type and the number of bills accommodated in the storage part for bills. When a predetermined service or the like is executed in the image forming apparatus 14, the cost according to the content of the service is subtracted from the amount of money inserted, and the remainder of the amount of money inserted is calculated. Also, when the change return lever is operated, coins or bills are returned according to the remainder of the amount of money inserted. In this regard, the coins are returned from the coin return slot, and the bills are returned from the bill insertion slot.

The person detection sensor 48 is a sensor for detecting whether a person (a user) is present in a predetermined area (zone) set in front of the image forming apparatus 14, and is, for example, a distance sensor. For example, an infrared sensor, an ultrasonic sensor, or a laser distance sensor is used as the distance sensor. The distance sensor outputs distance data to the CPU 22. The CPU 22 determines, in accordance with whether a distance indicated by the distance data output from the person detection sensor 48 is within a predetermined distance that defines the predetermined area, whether a person is present in the predetermined area in front of the image forming apparatus 14.

The communicator 50 is a communication circuit for connecting to the network 18. The communicator 50 includes a wired communication circuit or a wireless communication circuit, and communicates with, in accordance with an instruction from the CPU 22, an external computer (external terminal) such as the server 12, the mobile terminal 16, and the call center terminal 80, via the network 18, on the basis of a communication scheme conforming to a well-known telecommunications standard. The communicator 50 can directly communicate with other external computers, such as the mobile terminal 16, wirelessly (for example, by an infrared method, a WiFi (registered trademark) method, or a Bluetooth (registered trademark) method) not via the network 18.

Note that the electrical configuration of the image forming apparatus 14 illustrated in FIG. 2 is merely an example, and is not limited to the above.

The mobile terminal 16 is, for example, a portable (transportable) terminal (mobile terminal) that can be carried around, such as a general-purpose smartphone, feature phone, or tablet PC, and has various functions such as a call function, an e-mail function, and a browser function. Further, the mobile terminal 16 is not limited to a terminal possessed by the user, and a terminal provided at a place (for example, a store) where the image forming apparatus 14 is installed may also be used.

Figure 3:
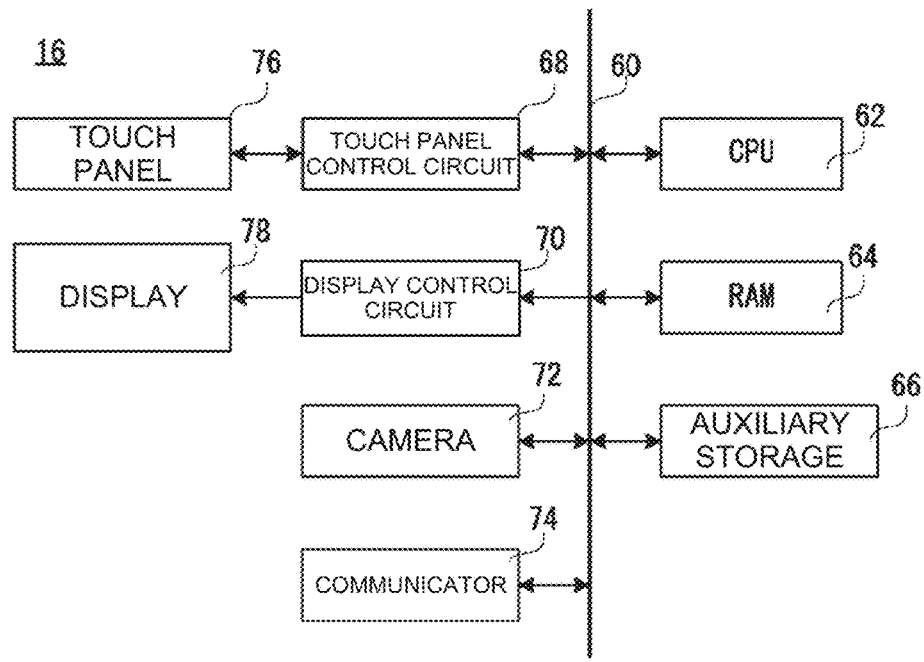
FIG. 3 is a block diagram illustrating an electrical configuration of a mobile terminal illustrated in FIG. 1.

FIG. 3 is a block diagram illustrating an electrical configuration of the mobile terminal 16 illustrated in FIG. 1. With reference to FIG. 3, the mobile terminal 16 includes a CPU 62. To the CPU 62, a RAM 64, an auxiliary storage 66, a touch panel control circuit 68, a display control circuit 70, a camera 72, and a communicator 74 are coupled via a bus 60. Also, a touch panel 76 is coupled to the touch panel control circuit 68, and a display 78 is coupled to the display control circuit 70.

The CPU 62 manages the overall control of the mobile terminal 16. The RAM 64 is used as a work area and a buffer area of the CPU 62. The auxiliary storage 66 is an auxiliary storage device of the mobile terminal 16.

The touch panel control circuit 68 applies a necessary voltage and the like to the touch panel 76, and also outputs, when a touch input is detected, the touch coordinate data indicating the position of the touch input to the CPU 62.

The display control circuit 70 includes a GPU and a VRAM or the like. Under an instruction from the CPU 62, the GPU generates, in the VRAM, display image data for displaying various screens on the display 78 by using image generation data stored in the RAM 64, and outputs the generated display image data to the display 78.

The camera 72 includes an imaging element (an image sensor) and a focusing lens whose position is adjustable, and captures an image by converting imaging light as visible light taken from the imaging element into an electrical signal. Examples of the imaging element include a solid-state imaging device such as a charge-coupled device (CCD) image sensor or a complementary metal oxide semiconductor (CMOS) image sensor. The RAM 64 stores captured image data output from the camera 72.

The communicator 74 includes a wireless communication circuit for connecting to the network 18, and communicates with an external computer such as the server 12, the image forming apparatus 14, and the call center terminal 80 via the network 18, in accordance with an instruction from the CPU 62. The communicator 74 can directly communicate with other external computers such as the image forming apparatus 14 by a wireless method, etc., as in the case of the communicator 50 (FIG. 2) of the image forming apparatus 14. That is, the communicator 74 can directly communicate with other external computers such as the image forming apparatus 14 not via the network 18. Also, the communicator 74 can perform wireless communication with a mobile phone base station to implement a voice call with another terminal device with which telephone communication is possible.

Note that the electrical configuration of the mobile terminal 16 illustrated in FIG. 3 is merely an example, and does not need to be limited to the above. Although not illustrated, the mobile terminal 16 includes a voice inputter/outputter. The voice inputter/outputter includes a speaker and a mike (microphone). The speaker outputs sounds, such as a ring tone to inform the user of an incoming telephone call and receipt of an e-mail, and voices from a telephone apparatus at the other end of the line during voice call implemented by the telephone communication. The user's voice is input to the microphone during voice call implemented by the telephone communication. Further, the mobile terminal 16 may be provided with a hardware operation button as another input means.

As described above, the image forming apparatus 14 receives a user operation on the input device 52 via the GUI displayed on the display 54. For example, a plurality of operation screens (setting screens) for setting of operating conditions of the image forming apparatus 14 are presented to the user, and a service is provided according to the details (operating conditions) set on each operation screen.

Figure 4:
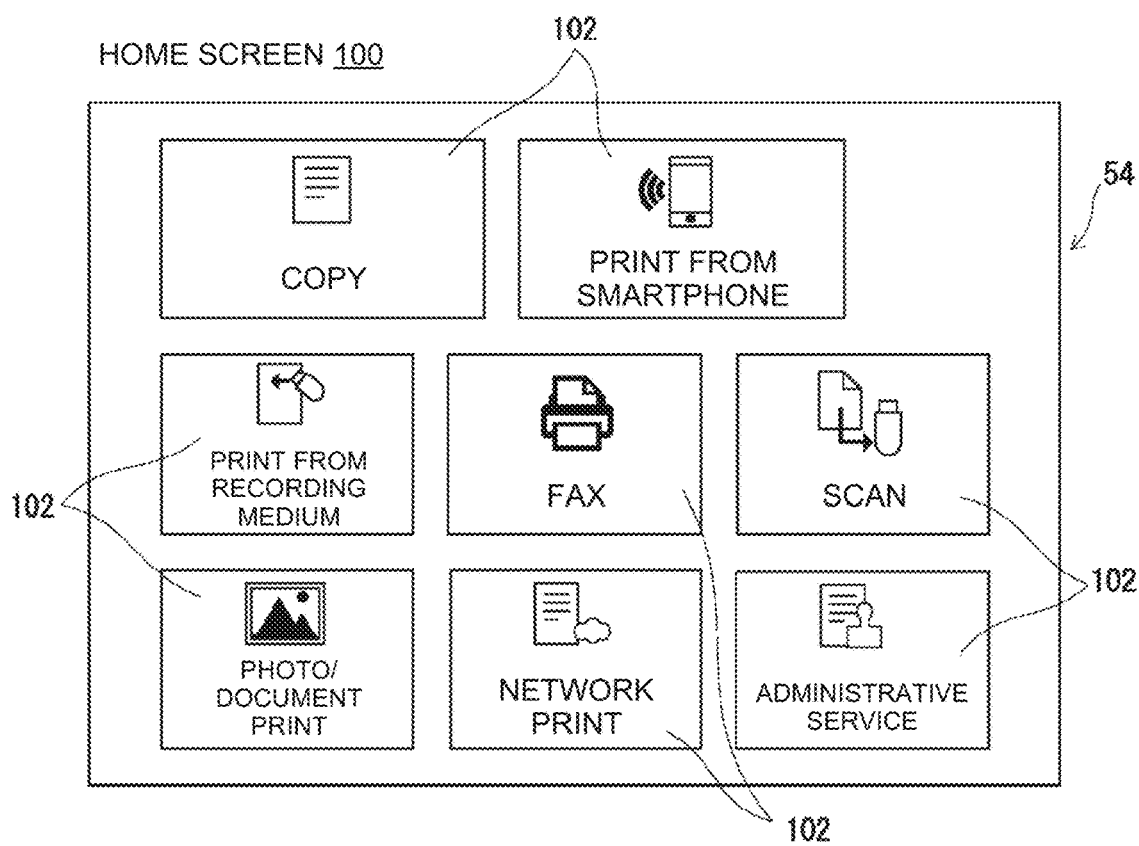
FIG. 4 is an illustrative view showing an example of a home screen.

For example, when a main power supply of the image forming apparatus 14 is turned on and the image forming apparatus 14 is in a standby state in which each of the functions can be executed, a home screen 100 as illustrated in FIG. 4 is displayed on the display 54 of the image forming apparatus 14.

The home screen 100 is an operation screen for selection of a service to be executed. The home screen 100 displays a plurality of selection icons 102 which function as software keys to select a service.

To the plurality of selection icons 102, services that can be provided by the image forming apparatus 14, such as "Copy", "Print from Smartphone", "Print from Recording Medium", "Fax", "Scan", "Photo/Document Print", "Network Print", and "Administrative Service", are respectively assigned.

The service "Print from Smartphone" refers to a print service that uses image data stored in a mobile terminal such as a smartphone. The service "Print from Recording Medium" refers to a print service that uses image data stored in a storage medium. The service "Network Print" refers to a print service that uses image data transmitted from an external computer (i.e., a network print service server). Furthermore, the "Administrative Service" refers to a print service to print an administrative certificate. Further, the copy service includes a service (normal copy service) for copying (duplicating) an image on a document such as a paper document on regular paper, a service (photo copy service) for copying a photograph image on photo paper, and the like.

When the selection icon 102 is operated on the home screen 100, in other words, when a service to be executed is selected, a plurality of operation screens for setting of the operating conditions of the selected service are sequentially displayed on the display 54. In the following, a case where a copy service is selected will be described as an example.

Figure 5:
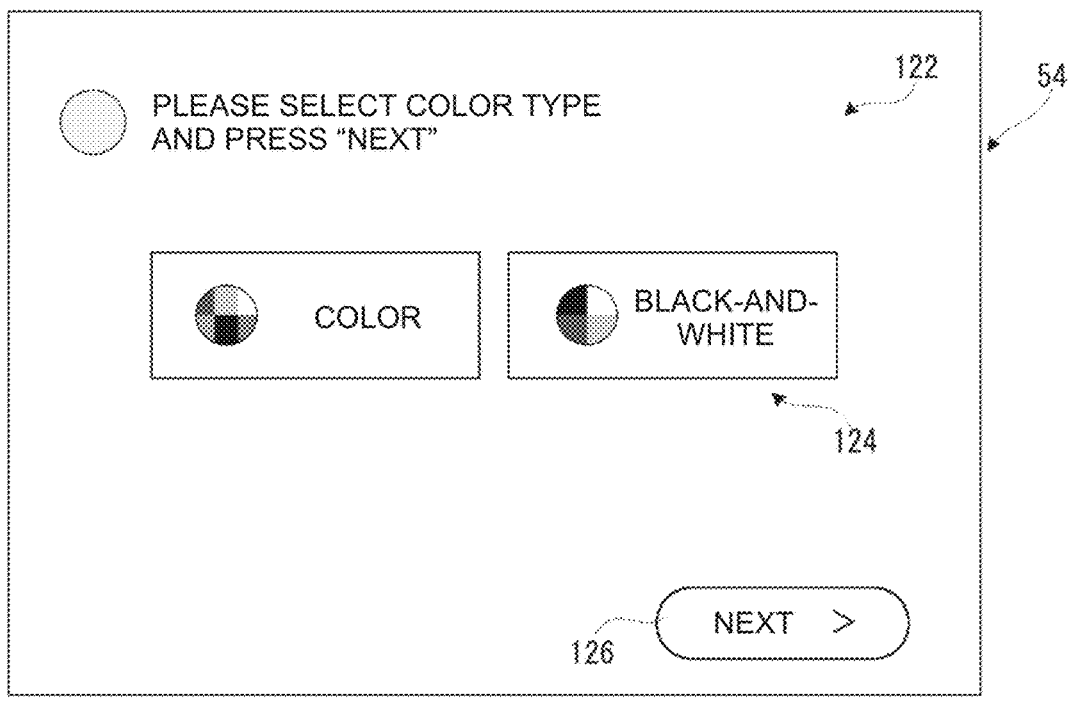
FIG. 5 is an illustrative view showing an example of a first setting screen.

When the selection icon 102 to which the copy service is assigned is operated on the home screen 100 (i.e., when the copy service is selected), a plurality of operation screens (copy setting screens) for making the setting of the operating conditions (copy conditions) of the copy service are sequentially displayed on the display 54. A first setting screen 120 illustrated in FIG. 5 is an example of the copy setting screen, and corresponds to one screen (for example, a screen to be displayed first) among the plurality of operation screens for making the setting of the operating conditions of the copy service.

The first setting screen 120 is a screen for setting a color mode (color condition) of the copy service, and includes a notification text 122, a setting part 124, and a transition icon 126.

The notification text 122 is a message, such as "Please select color type and press 'Next'.", for prompting the user to set (select) the color condition of the copy service and to transition to the next screen when the color condition has been set.

The setting part 124 is provided to set the color condition (color/black-and-white) of the copy service, and includes a plurality of setting icons to which mutually different color conditions (color/black-and-white) are assigned. As either of these setting icons is operated, the color condition of the copy service is set.

The transition icon 126 is an operation icon for proceeding to (i.e., for making a screen transition to) the next operation screen. When the transition icon 126 is operated, the display 54 presents an operation screen to be displayed subsequent to the operation screen displayed until then.

For example, on the first setting screen 120, when the transition icon 126 is operated, various operation screens for making the setting of the operating conditions of the copy service other than the color condition (i.e., paper size, magnification, the number of copies, etc.) are sequentially displayed on the display 54. When the operating conditions of the copy service assigned to the respective operation screens are set, the settings of the operating conditions of the copy service are complete, and a start key provided as a software key or a hardware key is pressed, the copy service is executed in accordance with the operating conditions set on the respective setting screens.

In the above, a case where the copy service is selected has been described as an example. However, also in cases where a service other than the copy service is selected, similarly, various operation screens for making the setting of the operating conditions are sequentially displayed.

Here, a user who is not used to using the image forming apparatus 14 may be uncertain of the service content or how to operate the image forming apparatus 14. A service for assisting such a user includes a user assistance service (a chatbot service) based on a chatbot function. Here, a chat is intended as having an interaction in real time by exchange of texts, and a chatbot service refers to a service in which a chatbot automatically responds to the user's inquiry content (question) by using AI technology such as artificial intelligence. Such a chatbot function may be called an automatic conversation function, an automatic response function, or an auto attendant function.

In addition, chatbots that use the AI technology are called "machine learning type", and since those chatbots learn day by day, they return the optimal answer from statistical data and algorithms. The chatbot can also deal with a natural language, which is a language spoken by humans, and similar language fluctuations.

Meanwhile, chatbots not equipped with AI are called "scenario type" chatbots, and they return an answer according to a scenario set in advance.

Cases where a question, which is difficult to be automatically responded to, is raised, or it is impossible to answer a question that does not conform to a scenario may be assumed. However, in such cases, an operator can directly answer the question instead to deal with the problem.

Figure 6:
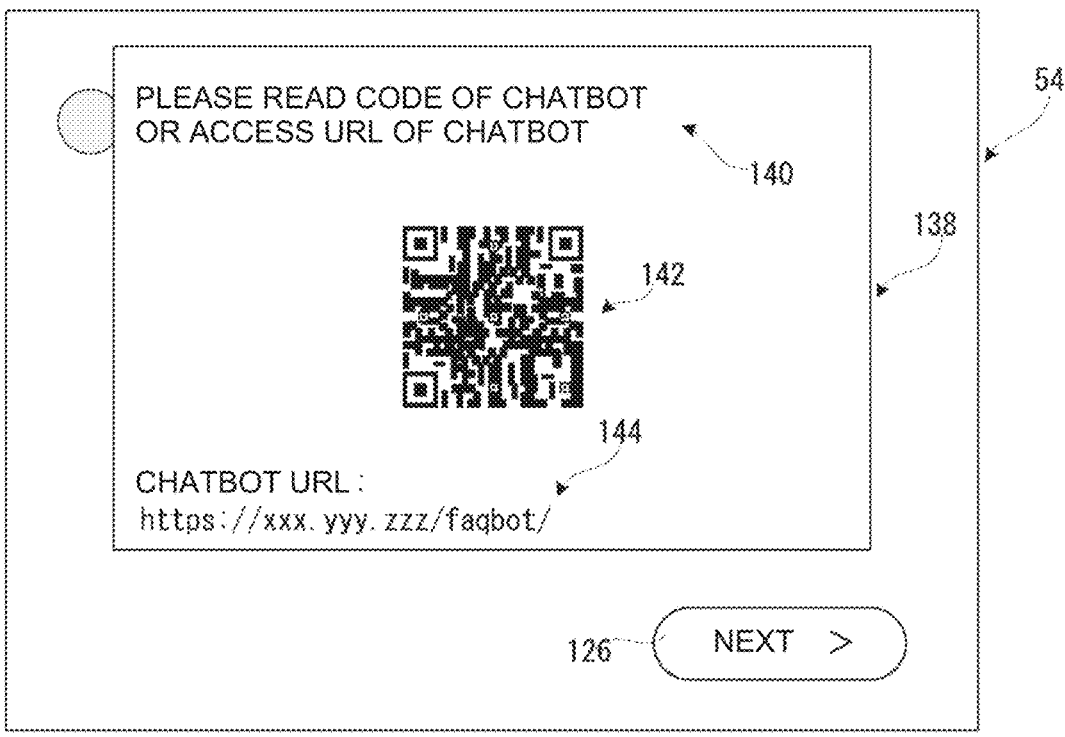
FIG. 6 is an illustrative view showing an example of an operation screen including a connection window.

In the image processing system 10 of the embodiment of FIG. 1, when a predetermined operation (hereinafter may be referred to as an "activation operation") is performed to start (activate) a chatbot service or when an activation condition for the chatbot service is satisfied, a connection window 138 for activating the chatbot service is displayed on the display 54, as illustrated in FIG. 6. The connection window 138 is displayed at the central part of a display area of the display 54 in an overlapping way in front of the operation screen displayed until then on the display 54. That is, the connection window 138 is displayed as a pop-up. FIG. 6 illustrates a case where the connection window 138 is displayed in front of the first setting screen 120.

The activation operation corresponds to a predetermined touch operation on a part other than that of the operation icons (such as the setting part 124 and the transition icon 126) provided on each operation screen. The touch operation as the activation operation includes, for example, a long tap (a long press) for a predetermined time or more, a slide (a drag), a flick, a double touch, a pinch-in, and a pinch-out. Further, the activation condition for the chatbot service corresponds to, for example, a state where the user remains in the periphery of the image forming apparatus 14 within a predetermined range therefrom, and none of the parts of the image forming apparatus 14 is operated continues for a predetermined time. Whether the user remains in the periphery of the image forming apparatus 14 within a predetermined range therefrom is determined in accordance with an output (distance data) of the person detection sensor 48.

On the connection window 138, a notification text 140, a coded image 142, and connection destination information 144 are displayed (provided). However, the connection window 138 is hidden from display when a predetermined time (for example, 180 to 300 seconds) has elapsed from the point of time of the display thereof.

The notification text 140 is a message, such as "Please read code of chatbot or access URL of chatbot.", for prompting reading of the coded image 142 by the mobile terminal 16 or access to the connection destination indicated by the connection destination information 144. The connection destination information 144 includes, for example, a character string indicating a uniform resource locator (URL) of the server 12 that has the chatbot function (i.e., that provides the chatbot service).

The coded image 142 is, for example, a barcode or a two-dimensional code. In the coded image 142, activation data is embedded. The activation data includes, for example, connection data to access a server (the server 12 in the present embodiment) that provides the chatbot service, and data of identification information on the image forming apparatus 14 (i.e., image forming apparatus identification data). The connection data corresponds to, for example, data on the URL of the server 12. The image forming apparatus identification data corresponds to information for identifying the image forming apparatus 14 by another device or terminal, such as ID data of the image forming apparatus 14 or data of information on a place where the image forming apparatus 14 is arranged.

When a predetermined application for reading the coded image 142 is activated in the mobile terminal 16 while the connection window 138 is displayed on the display 54, and the camera 72 captures the coded image 142, the mobile terminal 16 extracts the coded image 142 from the captured image and decodes the extracted coded image 142.

When the mobile terminal 16 decodes the coded image 142, the mobile terminal 16 acquires the activation data embedded in the coded image 142, and starts to access the server 12 that provides the chatbot service, in accordance with the activation data. In other words, communication between the mobile terminal 16 and the server 12 is started.

Figure 7:
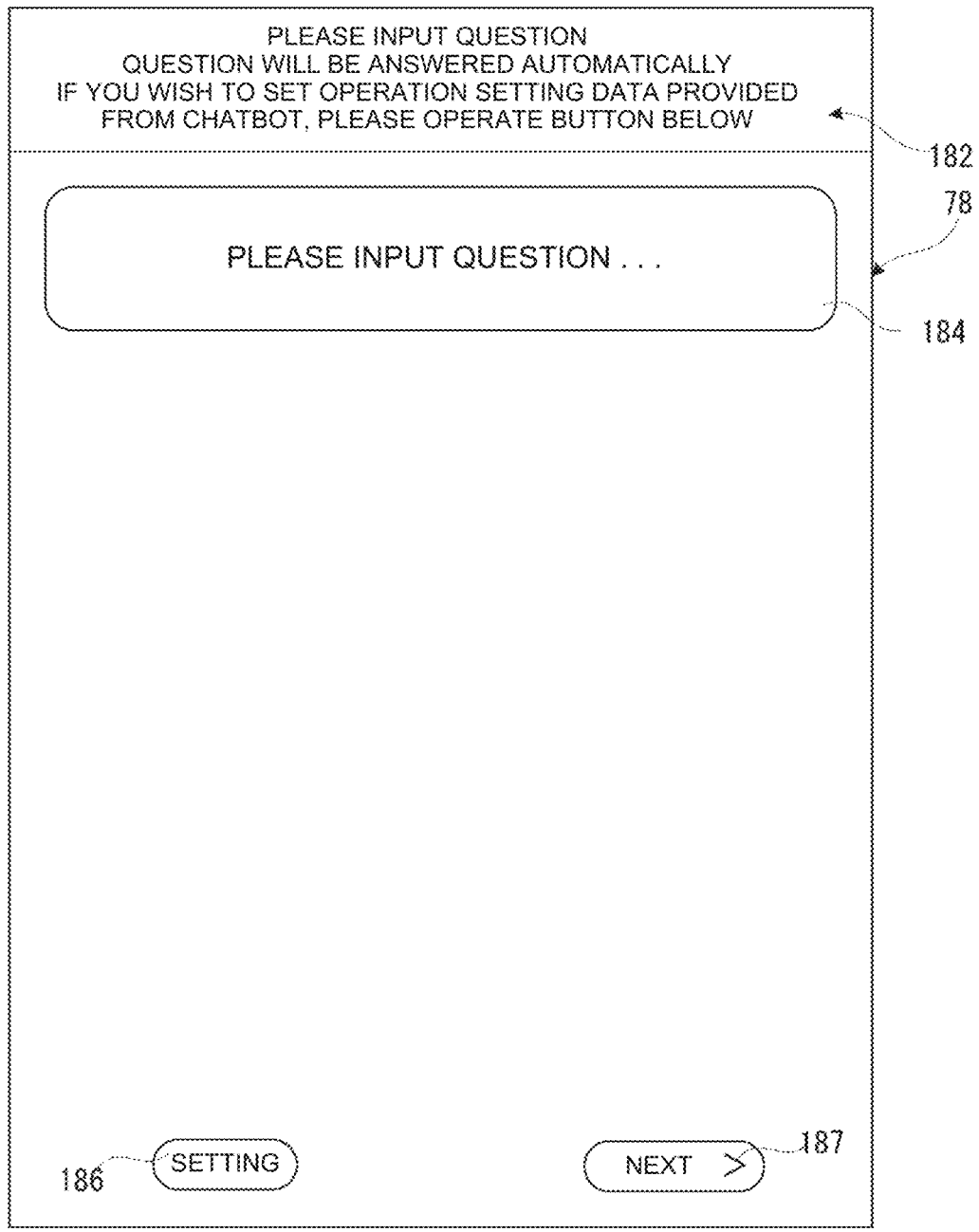
FIG. 7 is an illustrative view showing an example of a chat screen.

When the communication between the mobile terminal 16 and the server 12 is started, the mobile terminal 16 accesses the storage of the server 12, and acquires data (operation screen data) on the operation screen of the chatbot service. When the mobile terminal 16 acquires the operation screen data of the chatbot service, an operation screen (a chat screen) 180 of the chatbot service is displayed on the display 78 of the mobile terminal 16, as illustrated in FIG. 7.

The chat screen 180 is a screen for exchanging texts with a chatbot, and includes a notification text 182, and a question input part (a character input part) 184.

The notification text 182 is a message, such as "Please input question. Question will be answered automatically.", for prompting the user to input a question, and notifying the user that the question will be answered automatically. The question input part 184 is an input field (a text box) for the user to input the details of a question (a question text). When a predetermined operation (such as an operation of an enter key included in a character input application) is received in a state where the details of a question are input in the question input part 184, the question is confirmed.

In the present embodiment, operation setting data, which accompanies an answer text for the question asked through the chatbot, is allowed to be directly set to the image forming apparatus 14. Therefore, as the notification text 182, the words "If you wish to set operation setting data provided from chatbot, please operate button below." are further displayed.

Thus, the chat screen 180 further displays a setting button 186. Therefore, when the user wishes to directly set the operation setting data provided from the chatbot to the image forming apparatus 14, the user may operate this setting button 186. Meanwhile, when the setting button 186 is not operated, even if the chatbot has provided operation setting data accompanying the answer text, the operation setting data is not to be set to the image forming apparatus 14.

In addition, on the chat screen 180, a transition icon 187, which the user operates to indicate that the user's question has been resolved, in other words, to indicate that no further questions is raised, is set (displayed).

Figure 8:
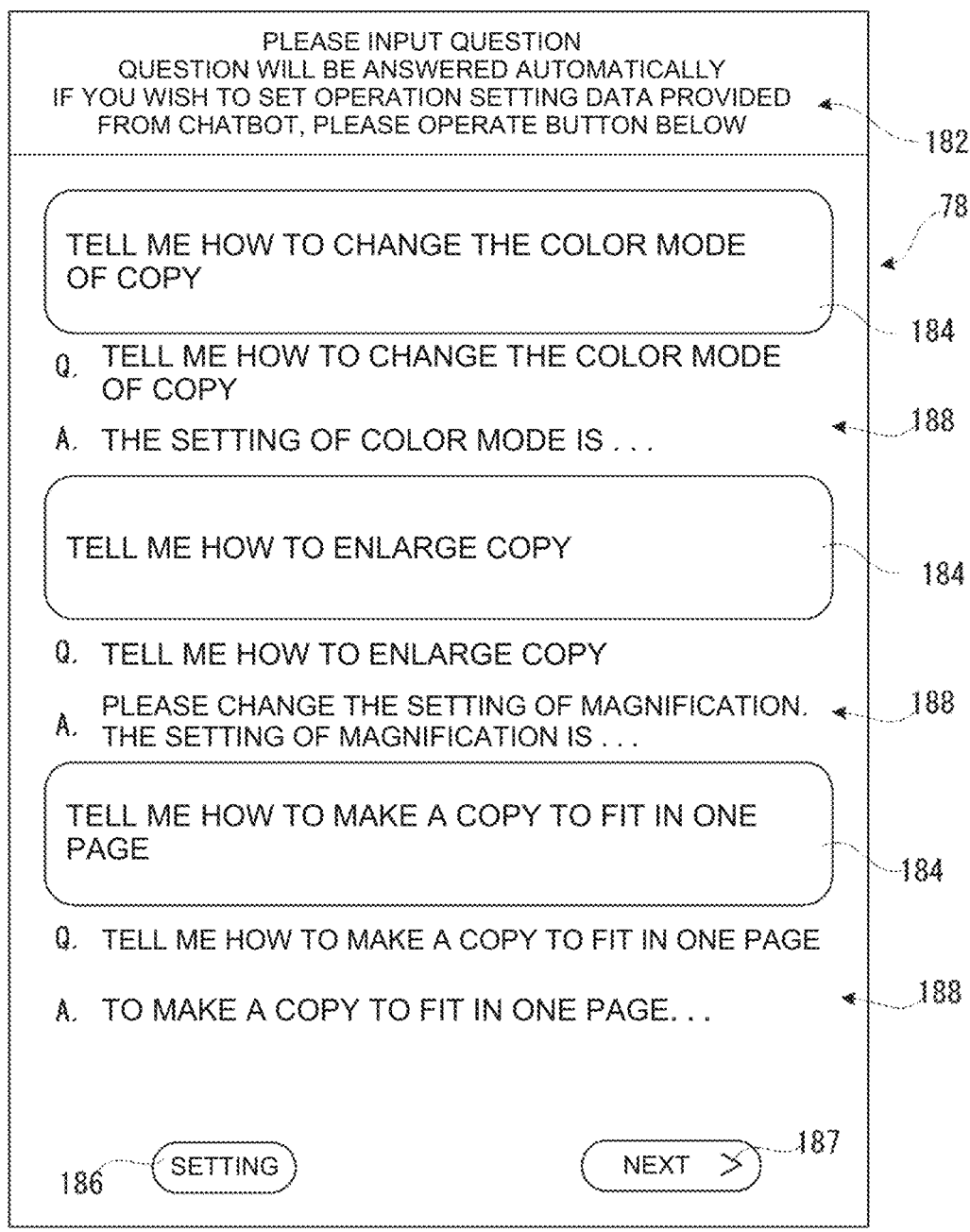
FIG. 8 is an illustrative view showing an example of a chat screen to be presented after input of a question.

When a question is input in the question input part 184 and the question is confirmed, data on the question (i.e., question data) is transmitted from the mobile terminal 16 to the server 12, and an answer (an answer text) for the question is generated by the server 12. When the answer to the question is generated, data on the answer (i.e., answer data) is transmitted (returned) from the server 12 to the mobile terminal 16 that has issued the question. As illustrated in FIG. 8, when the mobile terminal 16 receives the answer data, the mobile terminal 16 displays an answer text 188 in accordance with the answer data. When more than one question is asked, the answer text 188 is displayed for each question.

Figure 11:
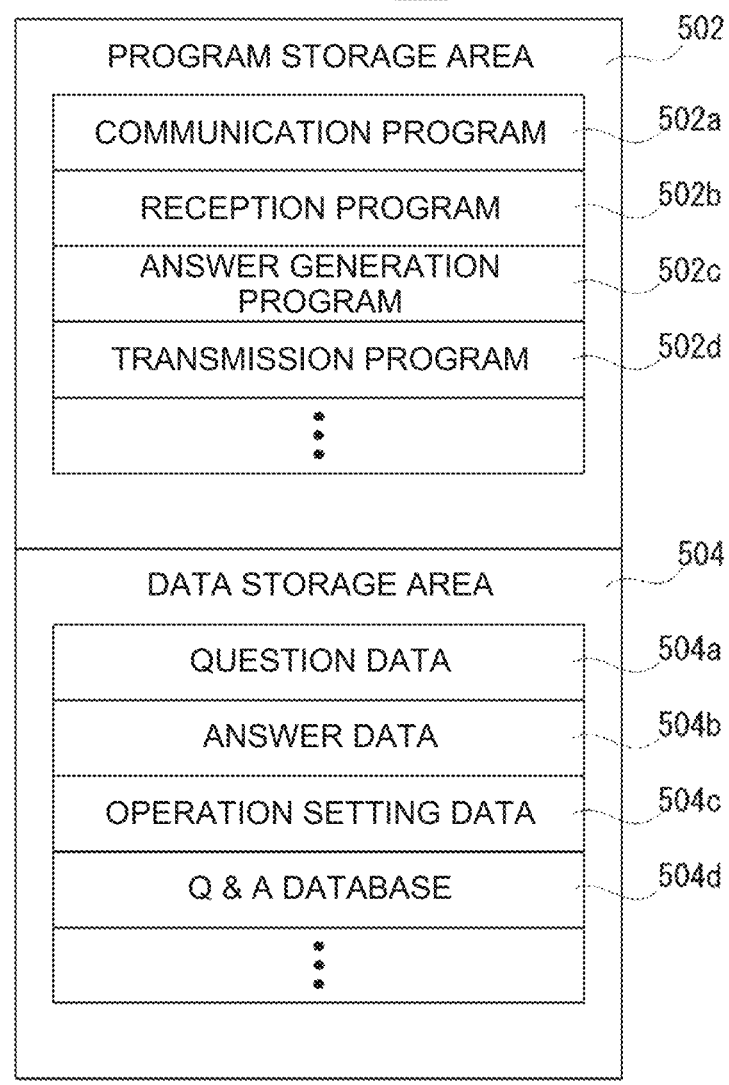
FIG. 11 is an illustrative view showing an example of a memory map of a RAM of a server illustrated in FIG. 1.

As regards a method in which a chatbot automatically gives an answer to a question that has been input, Japanese Unexamined Patent Application Publication No. 2019-128914 related to the present applicant describes such a method, so please refer to it. As a brief explanation, first, assumable question texts (registered texts) and answer texts for the respective registered texts are previously registered (stored) in a Q & A database 504d (FIG. 11). Having done that, a topic word, which is the subject or an object of the question text, and a predicate corresponding to the topic word are extracted from the question text input by the user, and when the question text includes the topic word, a registered text associated with the user's question text is searched for by using, as search words, the topic word, the predicate, and related terms of the topic word and the predicate. Then, the answer text for the registered text most highly associated with the search word is selected as an answer text for the user's question text.

In the present embodiment, the server 12 is configured to also extract the operation setting data necessary for executing a job, for which a question was asked, in the image forming apparatus 14, from the above-described Q & A database 504d (FIG. 11), accompanying the answer text as described above, and to return the extracted operation setting data together with the answer text.

In brief, in the present example, when a user of the image forming apparatus 14 installed at a public space, for example, does not know how to operate a job that he/she wishes to execute, the user accesses the chatbot from his/her mobile terminal 16, and receives an answer text from the server 12. At this time, the operation setting data is transmitted accompanying the answer text, and is received by the mobile terminal 16. As the received operation setting data is selectively set as the operation setting data for the image forming apparatus 14, the job is executed.

Figure 9:
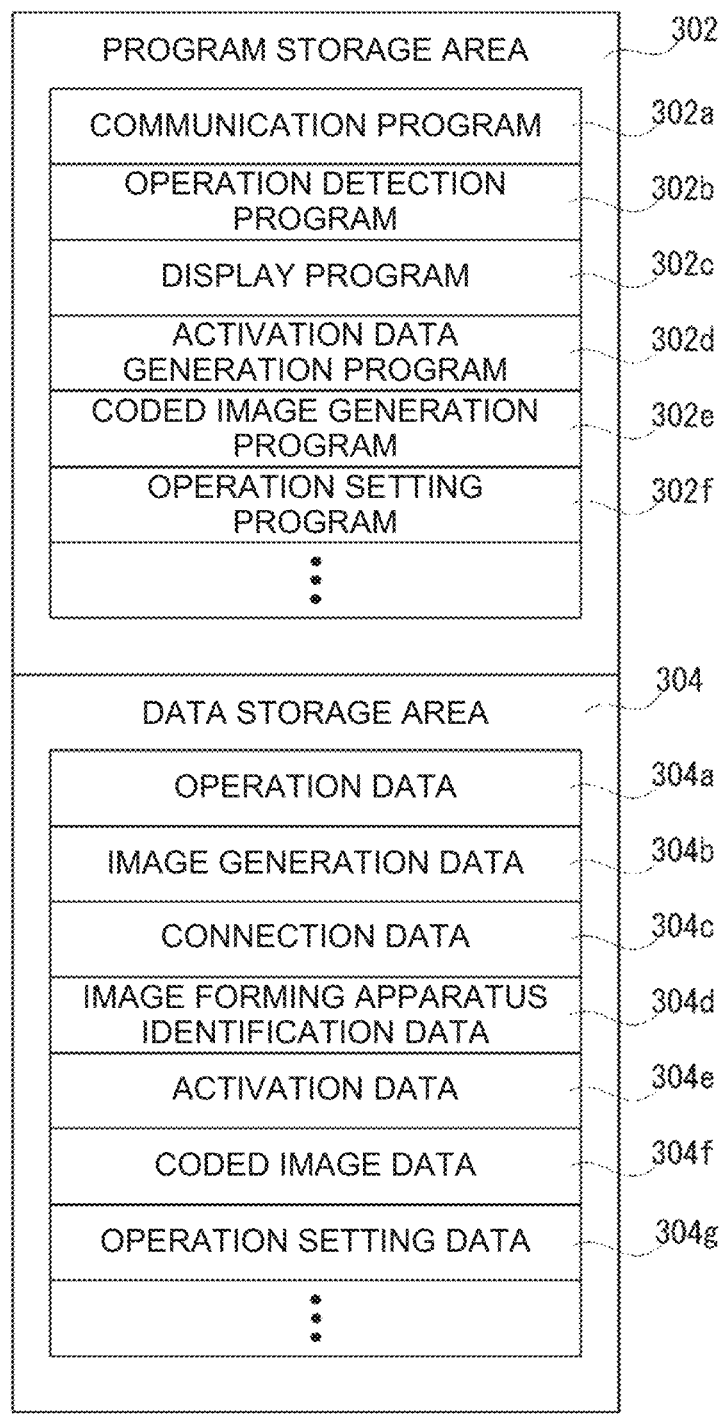
FIG. 9 is an illustrative view showing an example of a memory map of a RAM of the image forming apparatus illustrated in FIG. 2.

FIG. 9 is an illustrative view showing an example of a memory map 300 of the RAM 24 of the image forming apparatus 14 illustrated in FIG. 2. As illustrated in FIG. 9, the RAM 24 includes a program storage area 302 and a data storage area 304. In the program storage area 302 of the RAM 24, control programs for image forming apparatus including an operating system (OS) are stored. The control programs for image forming apparatus include a communication program 302a, an operation detection program 302b, a display program 302c, an activation data generation program 302d, and a coded image generation program 302e.

The communication program 302a is a program for performing communication (transmission and reception) of data with an external computer, such as the server 12, the mobile terminal 16, and the call center terminal 80, or another device via the network 18. Also, in accordance with the communication program 302a, the image forming apparatus 14 can directly communicate with the mobile terminal 16 by a wireless method or the like.

The operation detection program 302b is a program for detecting an operation input by a user to the operation button and the touch panel included in the input device 52. In accordance with the operation detection program 302b, the CPU 22 detects operation data or an operation signal generated by the user's operation on the operation button, or touch coordinate data input by an operation on the touch panel.

The display program 302c is a program for generating display image data, in other words, screen data of various operation screens, etc., as described above by using image generation data 304b to be described later, and outputting the generated data to the display 54. Also, the display program 302c is a program for outputting a coded image to the display 54 in accordance with coded image data to be described later.

The activation data generation program 302d is a program for generating activation data including connection data and image forming apparatus identification data, etc., for activating the chatbot service in the mobile terminal 16 or the like.

The coded image generation program 302e is a program for generating a coded image in which the activation data is embedded.

Further, as described below, an operation setting program 302f is a program for setting, as operation setting data 304g (described later), the necessary operation setting data included in the operation setting data that is input from the (chatbot) server 12 through the mobile terminal 16.

The operation setting program 302f does not directly set the setting data transmitted from the server 12 through the mobile terminal 16 as the operation setting data 304g, but gives priority to the operation data originally set by the user. For this reason, the operation setting program 302f has the function of determining the presence or absence of duplication between the operation setting data originally set by the user and the operation setting data received from the chatbot. For example, the operation setting program 302f extracts the operation setting data originally set by the user as operation data 304a, compares the extracted operation setting data with the operation setting data received from the chatbot, and determines the presence or absence of duplication.

The operation setting program 302f further causes a selection screen (not shown), which performs the display such that the operation setting data received from the chatbot and the operation setting data originally set by the user are displayed in contrast to each other, thereby enabling the user to select the operation setting data that has not yet been set, to be displayed on the display 54 (FIG. 2).

The operation setting program 302f also has the function of determining whether the operation setting data, which is necessary for executing the job desired by the user then, has been set, and if there exists operation setting data that has not yet been set, an operation screen (not shown) that has not yet been set is displayed on the display 54, thereby prompting the user to set the unset operation setting data.

Although not illustrated, in the program storage area 302, a code reading program for controlling the code reader 32 to extract a coded image from a captured image, which has been captured by a laser scanner or a camera, and decode the extracted coded image; a paper strip print program for controlling the paper strip printer 34 to print a character string, an image, a bar code, and the like, on a roll of paper; a photoprinting program for controlling the photoprinter 36 to print an image on photo paper; a short-range communication program for controlling the short-range communicator 38 to implement data communication with a communication target (such as an identification card, a membership card, or an electronic money medium); an image reading program for controlling the image reader 40 to read an image on a document, and output an image signal (a transmission image) corresponding to the read image; an image forming program for controlling the image former 42 to print a multicolor or monochromatic print image on paper according to print data; a storage medium connection program for controlling writing of data to various recording media mounted to the storage medium connector 44 and reading of data from the various recording media; a program for setting a fee for a service or the like of the image forming apparatus 14; a program for controlling the money processor 46 to calculate an amount of money inserted, and return a coin from a coin return slot 46b and a bill from the bill insertion slot, according to the remaining amount of money calculated by subtracting the fee for a predetermined service or the like from the amount of money inserted; and a program for selecting and executing various functions provided in the image forming apparatus 14, for example, are also stored.

In addition, in the data storage area 304 of the RAM 24, the above-described operation data 304a, the image generation data 304b, connection data 304c, image forming apparatus identification data 304d, activation data 304e, and coded image data 304f, for example, are stored.

The operation data 304a corresponds to operation setting data including the operation data of the input device 52 (FIG. 2) and/or touch coordinate data detected in accordance with the operation detection program 302b. The operation data 304a further includes the operation setting data received through the chatbot as described above.

The image generation data 304b corresponds to data such as polygon data or texture data for generating display image data corresponding to various screens to be displayed on the display 54.

The connection data 304c corresponds to data for accessing the server (the server 12 in the present embodiment) that provides the chatbot service. The image forming apparatus identification data 304d corresponds to data of information for identifying the image forming apparatus 14 by another device or terminal.

The activation data 304e corresponds to data for activating the chatbot service in the mobile terminal 16 or the like, which is to be generated in accordance with the activation data generation program 302d. The activation data 304e includes, for example, the connection data 304c and the image forming apparatus identification data 304d.

The coded image data 304f corresponds to data on a coded image in which the activation data is embedded, which is to be generated in accordance with the coded image generation program 302e.

The operation setting data 304g includes not only the operation setting data originally set until the user asked a question to the chatbot, but also the operation setting data obtained through the chatbot, and includes all items of the operation setting data necessary for a job set by the user then.

Although not illustrated, in the data storage area 304, other data necessary for executing the control program for image forming apparatus are stored, and a timer (a counter) or a register necessary for executing the control program for image forming apparatus is provided.

Figure 10:
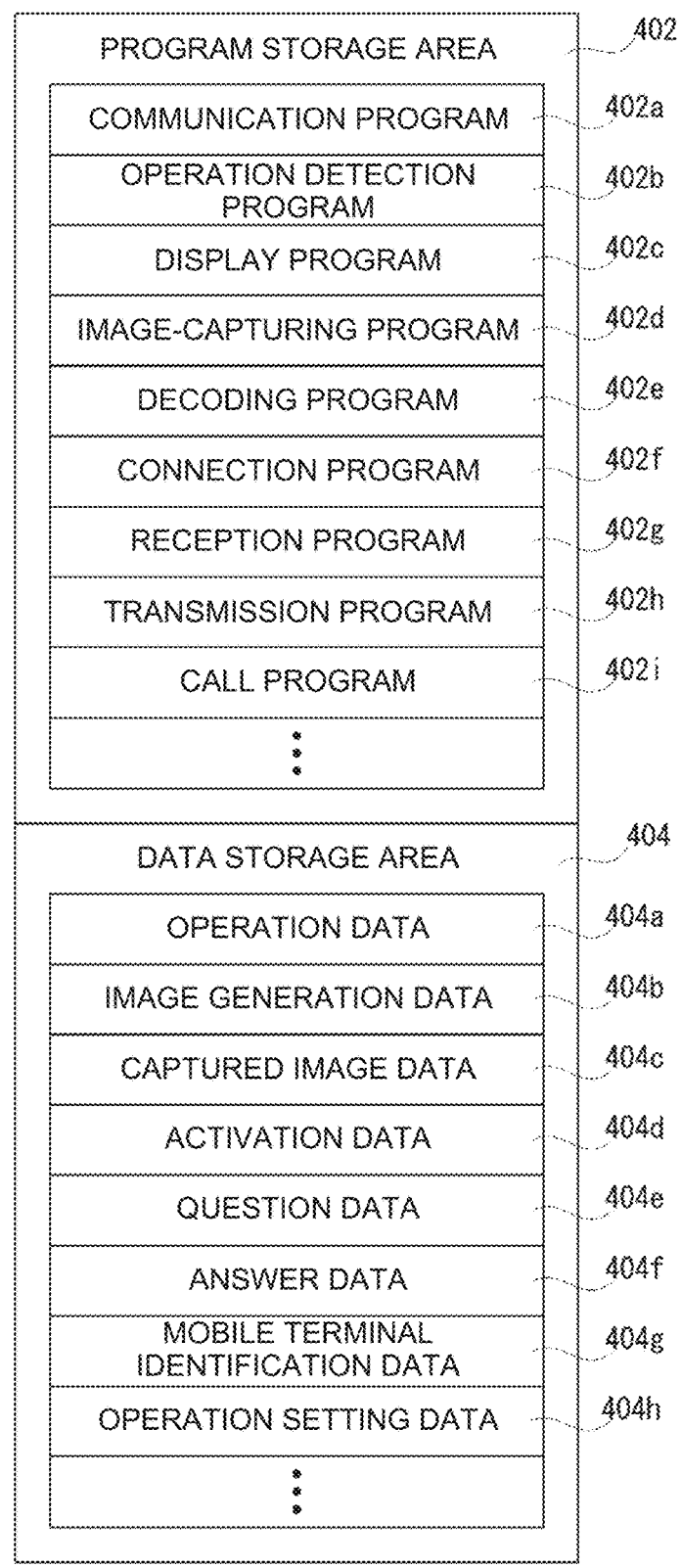
FIG. 10 is an illustrative view showing an example of a memory map of a RAM of the mobile terminal illustrated in FIG. 3.

FIG. 10 is an illustrative view showing an example of a memory map 400 of the RAM 64 of the mobile terminal 16 illustrated in FIG. 3. As illustrated in FIG. 10, the RAM 64 includes a program storage area 402 and a data storage area 404. In the program storage area 402 of the RAM 64, control programs for mobile terminal including an OS are stored, as described above. The control programs for mobile terminal include a communication program 402a, an operation detection program 402b, a display program 402c, an image-capturing program 402d, a decoding program 402e, a connection program 402f, a reception program 402g, a transmission program 402h, and a call program 402i.

The communication program 402a is a program for communicating data with an external computer, such as the server 12, the image forming apparatus 14, and the call center terminal 80, or another device via the network 18. Also, in accordance with the communication program 402a, the mobile terminal 16 can directly communicate with the image forming apparatus 14 by a wireless method or the like. Further, the communication program 402a is also a program for controlling wireless communication with a mobile phone base station.

The operation detection program 402b is a program for detecting an operation input by the user to the touch panel 76. The display program 402c is a program for generating screen data of various operation screens, etc., by using image generation data 404b to be described later, and outputting the screen data to the display 78.

The image-capturing program 402d is a program for controlling the camera 72 and generating a captured image. The decoding program 402e is a program for extracting a coded image from the captured image, and decoding the extracted coded image.

The connection program 402f is a program for connecting to (i.e., accessing) the server 12 having the chatbot function, in accordance with the activation data (connection data) to be obtained by decoding the coded image.

The reception program 402g is a program for receiving answer data and the accompanying operation setting data transmitted from the server 12. However, in receiving these items of data, communication processing is executed in accordance with the communication program 402a.

The transmission program 402h is a program for transmitting, to the server 12, data on a question (i.e., question data) input by the user in the chatbot service, and transmitting, to the image forming apparatus 14, operation setting data 404h received from the server 12. However, in transmitting the data, communication processing is executed in accordance with the communication program 402a.

The call program 402i is a program for executing voice call processing. However, in executing the voice call processing, communication processing is executed in accordance with the communication program 402a.

Although not illustrated, in the program storage area 402, a program for selecting and executing various functions provided in the mobile terminal 16, etc., is also stored.

In addition, in the data storage area 404 of the RAM 84, operation data 404a, the image generation data 404b, captured image data 404c, activation data 404d, question data 404e, answer data 404f, mobile terminal identification data 404g, and the operation setting data 404h, for example, are stored.

The operation data 404a corresponds to operation input data including touch coordinate data detected in accordance with the operation detection program 402b. The image generation data 404b corresponds to data such as polygon data or texture data for generating display image data corresponding to various screens to be displayed on the display 78.

The captured image data 404c corresponds to data on a captured image which has been captured by the camera 72 in accordance with the image-capturing program 402d.

The activation data 404d corresponds to data obtained by decoding the coded image, and includes connection data for accessing the server that provides the chatbot service, and image forming apparatus identification data for identifying the image forming apparatus 14 which has generated the activation data.

The question data 404e corresponds to data on a question input by the user in the chatbot service. The answer data 404f corresponds to data on an answer to the question, which is transmitted from the server 12.

The mobile terminal identification data 404g corresponds to data of identification information on the mobile terminal 16 itself.

The operation setting data 404h corresponds to operation setting data for the image forming apparatus 14 that is included in the answer data for the question given by the chatbot from the server 12. The operation setting data 404h is transmitted to the image forming apparatus 14, in accordance with the transmission program 402h described above.

Although not illustrated, in the data storage area 404, other data necessary for executing the control program for mobile terminal are stored, and a timer (a counter) or a register necessary for executing the control program for mobile terminal is provided.

FIG. 11 is an illustrative view showing an example of a memory map 500 of the RAM 12b of the server 12 illustrated in FIG. 1. As illustrated in FIG. 11, the RAM 12b includes a program storage area 502 and a data storage area 504. In the program storage area 502 of the RAM 12b, control programs for server including an OS are stored, as described above. The control programs for server include a communication program 502a, a reception program 502b, an answer generation program 502c, and a transmission program 502d.

The communication program 502a is a program for communicating data with an external computer, such as the image forming apparatus 14, the mobile terminal 16, and the call center terminal 80, or another device via the network 18.

The reception program 502b is a program for receiving question data, etc., transmitted from the mobile terminal 16. Also, the reception program 502b is a program for receiving history transmission instruction data transmitted from the mobile terminal 16. However, in receiving the data, communication processing is executed in accordance with the communication program 502a.

The answer generation program 502c is a program for automatically generating an answer to the question indicated by the question data, and the accompanying operation setting data. When the answer generation program 502c receives question data, the answer generation program 502c refers to the Q & A database 504d (described later), and generates answer data for the question data. At this time, the operation setting data for the image forming apparatus 14, which accompanies the answer data thus generated, is extracted from the Q & A database 504d, and included in the answer data.

The transmission program 502d is a program for transmitting, to the mobile terminal 16, data on the answer (answer data and the accompanying operation setting data) generated in accordance with the answer generation program 502c. In transmitting the data, communication processing is executed in accordance with the communication program 502a.

Although not illustrated, in the program storage area 502, a program for selecting and executing various functions provided in the server 12, etc., is also stored.

Also, in the data storage area 504 of the RAM 12b, question data 504a, answer data 504b, operation setting data 504c, and the Q & A database 504d, for example, are stored.

The question data 504a is data on the question input by the user in the chatbot service, which is to be transmitted from the mobile terminal 16. The answer data 504b is data on the answer to the question indicated by the received question data, which is to be generated in accordance with the answer generation program 502c. The answer data includes operation setting data for the image forming apparatus 14 accompanying this answer data.

The operation setting data 504c corresponds to operation setting data received from the mobile terminal 16 when chatbot access is received from the mobile terminal 16.

As explained earlier, the Q & A database 504d is a database including preregistered answer texts to question texts that are assumed. Further, accompanying the answer text, operation setting data necessary for executing a job, for which a question was asked, in the image forming apparatus 14 is also registered in the above-described Q & A database 504d (FIG. 11), in association with the answer text.

For example, for the question "Tell me how to make a copy in color", an answer text "Please set the document on the document table, select the paper size, and set the color mode.", and items of operation setting data, which are the paper size "A4" and the color mode "Full Color", accompanying the answer data, are registered in advance.

Figure 12:
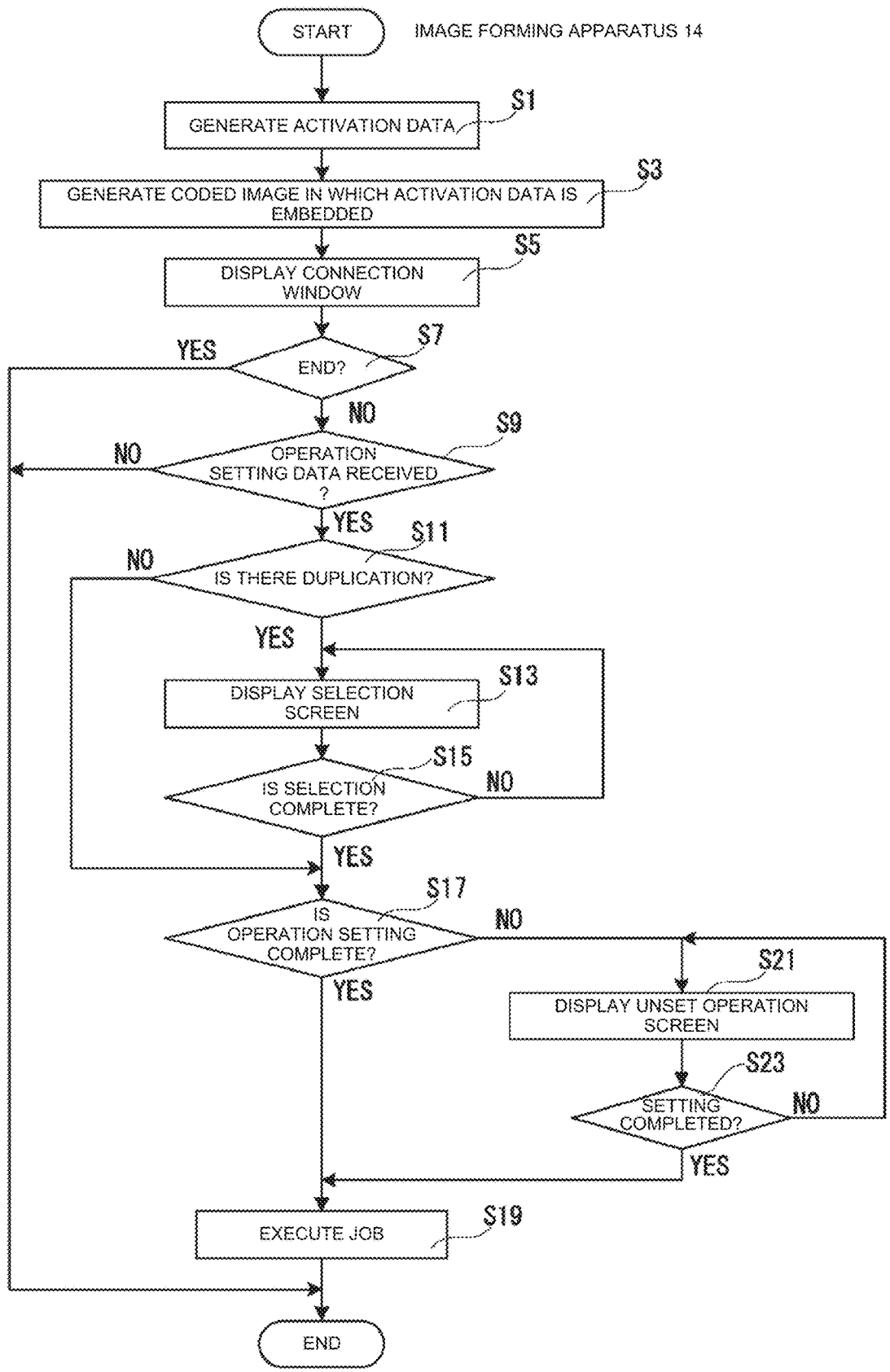
FIG. 12 is a flowchart showing an example of the operation of the image forming apparatus illustrated in FIG. 2.

Although not illustrated, in the data storage area 504, other data necessary for executing the control program for server are stored, and a timer (a counter) or a register necessary for executing the control program for server is provided. FIG. 12 is a flowchart showing an example of the operation of the image forming apparatus 14 illustrated in FIG. 2. The information processing is started when an activation operation is received or when an activation condition for the chatbot service is satisfied.

As illustrated in FIG. 12, the CPU 22 of the image forming apparatus 14 generates, in step S1, activation data including connection data and image forming apparatus identification data, generates, in step S3, a coded image in which the activation data is embedded, and displays, in step S5, the connection window 138 including the coded image.

When the user uses the chatbot to ask a question, the user decodes the coded image 142 by means of the mobile terminal 16, as described above. The activation data embedded in the coded image 142 is acquired accordingly. At this time, together with the activation data, the operation setting data 304g (FIG. 9) set to the image forming apparatus 14 by the user up to that point is absorbed into the mobile terminal 16.

After step S5, in step S7, it is determined whether the operation is to be ended. For example, in step S7, it is determined whether a predetermined time has elapsed from the point of time of the display of the connection window 138. When step S7 is "YES", the operation is ended.

Meanwhile, if it is determined as "NO" in step S7, the CPU 22 determines, in the subsequent step S9, whether or not operation setting data has been received from the mobile terminal 16. The determination is carried out in accordance with the operation setting program 302f (FIG. 9).

If it is determined as "NO" in step S9, the operation is ended, whereas if it is determined as "YES" in step S9, in the next step S11, the CPU 22 determines whether there exists duplication between the operation setting data received from the mobile terminal 16 through the chatbot and the operation setting data originally set by the user, in accordance with the operation setting program 302f. For example, in the previous example, suppose that the user has already set the size "A4", and items of the operation setting data which are the size "A4" and the color mode "Full Color" are input through the chatbot, it is determined that "A4" is duplicated.

If it is determined as "YES" in step S11, in the next step S13, the CPU 22 displays the selection screen (not shown) described above on the display 54, and prompts the user to select the operation setting data that has not yet been set.

In step S13, the selection screen (not shown) is continuously displayed on the display 54 until it is determined that the selection is complete in step S15. On the selection screen, items of the operation setting data obtained from the chatbot are respectively displayed, and when the user selects those items of data, a check mark is put on the relevant operation setting data. Further, when the user finishes selecting the necessary operation setting data, he/she operates an "OK" button (not shown), for example. Therefore, whether or not the selection is complete is determined by whether or not the "OK" button displayed on the selection screen has been operated.

In this way, if there exists duplication between the operation setting data received from the mobile terminal 16 through the chatbot and the operation setting data originally set by the user, the user is prompted to make a selection of the data. For this reason, the operation setting data set by the user can be set preferentially, and the user's intention can be easily reflected in the job.

When it is determined that the selection is complete in step S15, in step S17, it is determined whether the operation setting is complete. Specifically, in step S17, it is determined whether all items of the operation setting data necessary for executing the job (for example, "photo color copy") set by the user then have been set or not.

For example, when the activation data is to be generated in step S1, since the CPU 22 has a grasp of the job that the user wishes to execute, and the operation setting data set by the user until then (i.e., the operation setting data 304g), and simultaneously knows what operation setting data has been set through the chatbot in steps S9 to S15, the CPU 22 can easily determine whether there exists operation setting data that has not yet been set. Here, "operation setting data that has not yet been set" refers to an item left unchanged by the user from a default setting state. This makes it easy to determine whether or not the operation setting data necessary for executing the above job has been set.

Then, if it is determined as "YES" in step S17, the CPU 22 executes the job in step S19.

If it is determined as "NO" in the previous step S17, in other words, when the settings necessary for the job execution are not complete, in step S21, an operation screen for the unset data (not shown) is displayed on the display 54. For example, in the previously exemplified job of "Making a color copy of a photo", there may be a case where the paper size "A4" and the color mode "Full Color" have been set, but the number of copies has not yet been set. In that case, the CPU 22 displays an operation screen for prompting the number of copies to be set on the display 54. Also, examples of the unset data include paper setting (for example, whether to use plain paper or photo paper) in the case of photo copying.

Then, in step S23, whether the settings are complete is determined in the same way as for step S17. If it is determined as "YES", the processing proceeds to the previously mentioned step S19, whereas if it is determined as "NO", the processing returns to step S21. In other words, an unset operation display screen of step S21 is repeatedly displayed until it is determined as "YES" in step S23.

When the job execution of step S19 is ended, the operation of the image forming apparatus 14 is ended.

Figure 13:
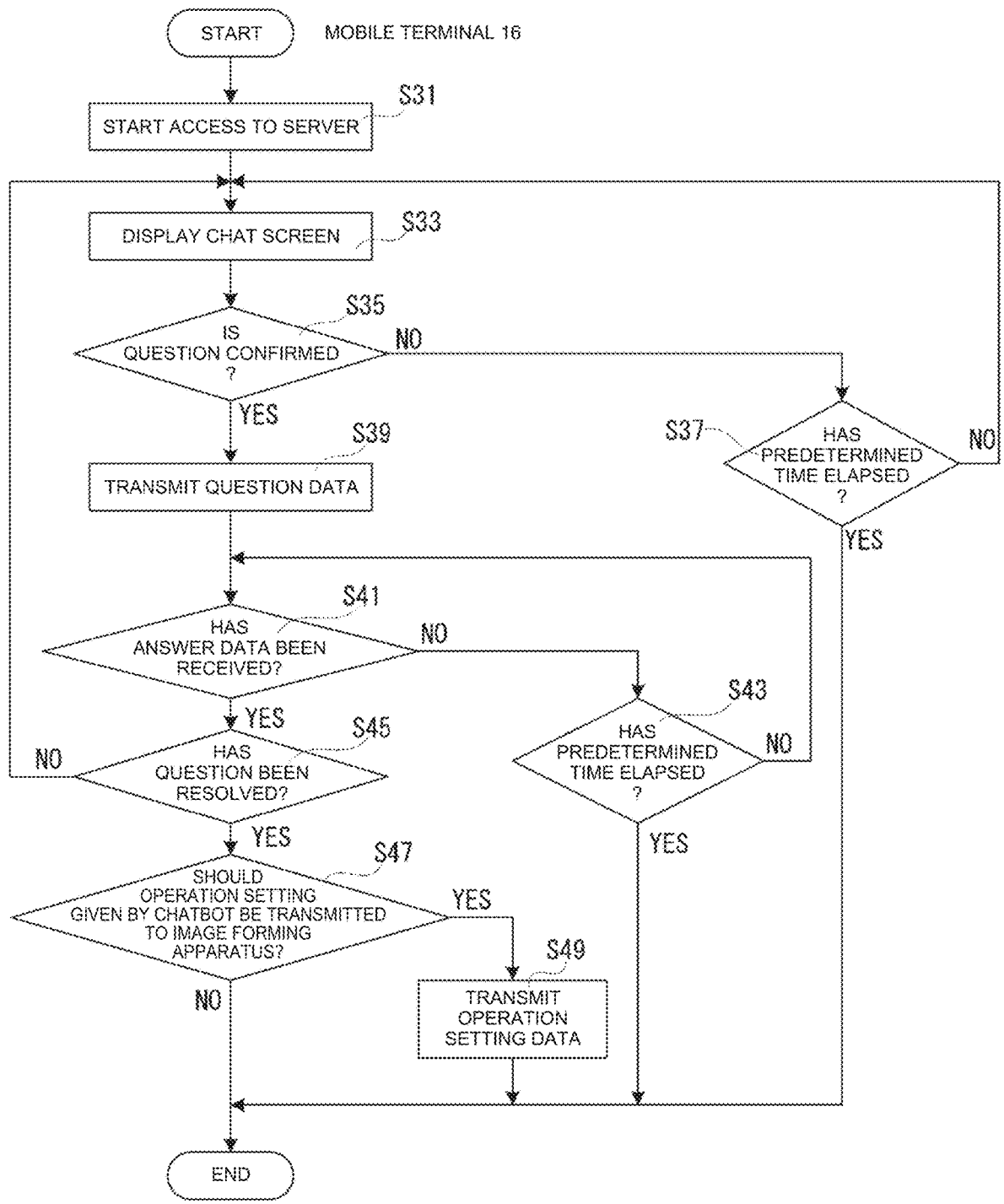
FIG. 13 is a flowchart showing an example of the operation of the mobile terminal shown in FIG. 3.

FIG. 13 is a flowchart showing an example of the operation of the mobile terminal 16. The operation indicated in FIG. 13 is started when the activation data (and also the operation setting data, if any) is acquired.

As illustrated in FIG. 13, when the operation is started, the CPU 62 of the mobile terminal 16 starts to access the server 12 that provides the chatbot service in accordance with the connection data included in the activation data, in step S31, and acquires data on the operation screen of the chatbot service from the server 12 and displays the operation screen (the chat screen) of the chatbot service on the display 78, in step S33.

When the mobile terminal 16 accesses the server 12 in step S31, the mobile terminal 16 transmits the operation setting data that has been acquired from the image forming apparatus 14 through the previously mentioned step S5 (FIG. 12) to the server 12. Then, in step S35, it is determined whether a question is confirmed or not. Here, it is determined whether a question has been input in the question input part 184 (FIG. 7), and an operation for confirming the question has been received.

If it is "NO" in step S35, in other words, if it is determined that the question is not confirmed, it is determined in step S37 whether a predetermined time has elapsed, and if it is determined as "YES" in step S37, the operation is ended.

If it is determined as "YES" in step S35 before the predetermined time elapses in step S37, in the next step S39, data indicating the question (question data) is transmitted to the server 12, and it is determined in step S41 whether answer data has been received from the server 12.

If it is "NO" in step S41, in other words, if it is determined that answer data has not been received from the server 12, it is determined in step S43 whether a predetermined time has elapsed, and if it is "NO" in step S43, the operation returns to step S41. However, if it is determined that the predetermined time has elapsed in step S43, the operation is ended.

Meanwhile, if it is "YES" in step S41, in other words, if it is determined that answer data has been received, the content of an answer indicated by the answer data is displayed on the display 78 (FIG. 3), and the processing proceeds to step S45.

In the present example, the answer data is, for example, text data such as "When copying a photo in color, please set 'Full Color' as the color mode.".

Following that, in step S45, the CPU 62 determines, in receipt of a user operation, for example, whether a question that the user asked has been resolved. For example, when the transition icon 187 has been operated on the chat screen 180 indicated in FIGS. 7 and 8, the CPU 62 determines as "YES" in step S45.

If it is determined as "YES" in step S45, the CPU 62 determines, in the next step S47, whether the operation setting data ("Full Color" in the above example) accompanying the data on the answer text given by the chatbot that has been received in the previous step S41 should be transmitted to the image forming apparatus 14 or not. The determination of step S47 is made according to whether the setting button 186 displayed on the chat screen 180 indicated in FIG. 7 or FIG. 8 has been operated or not. For example, when the setting button 186 has been operated, it can be determined as "YES" in step S47.

If it is determined as "YES" in step S47, the CPU 62 transmits, by using the communication program 402a, the operation setting data accompanying the data on the answer text given by the chatbot that has been received in the previous step S41 to the image forming apparatus 14.

Figure 14:
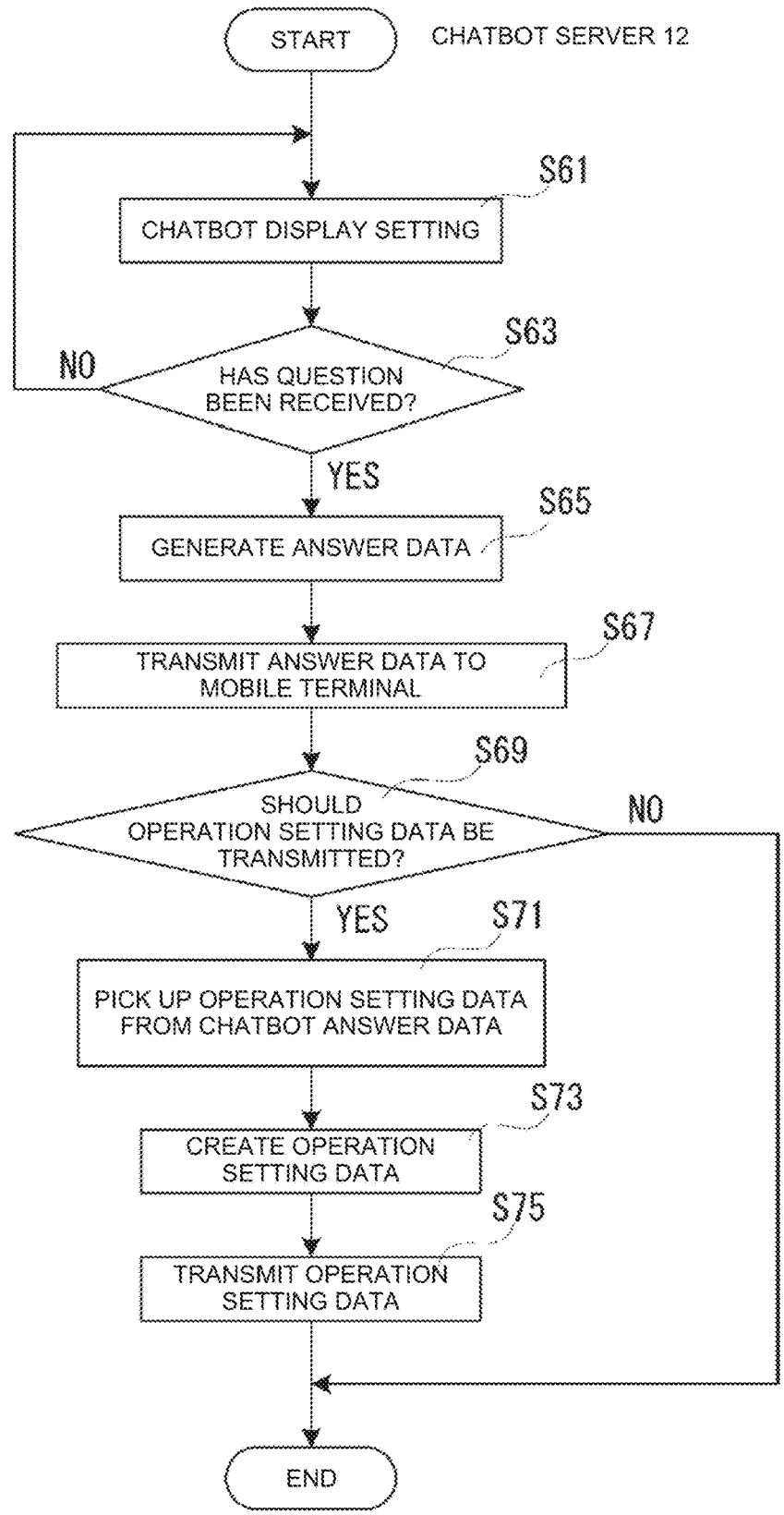
FIG. 14 is a flowchart illustrating an example of the operation of the server illustrated in FIG. 1.

FIG. 14 is a flowchart showing an example of the operation of the server 12. As illustrated in FIG. 14, the CPU 12a of the server 12 stores, when an access is made from the mobile terminal 16 (FIG. 13: step S31), the operation setting data (the one set to the image forming apparatus 14 then) received from the mobile terminal 16 in the data storage area 504 (FIG. 11), and also executes chatbot display setting for display of the chat screen 180 (FIG. 7) on the mobile terminal 16.

Then, in the next step S63, it is determined whether a question through a chatbot has been received from the mobile terminal 16. When the question is received, it is determined as "YES" in step S63, and the processing proceeds to the next step S65.

In step S65, the server 12 refers to the Q & A database 504d to generate an answer text (i.e., answer data) for this question, and transmits the answer data to the mobile terminal 16 in step S67.

In the next step S69, on the basis of whether the setting button 186 on the previously mentioned chat screen 180 (FIGS. 7 and 8) has been operated, the CPU 12a determines whether or not to transmit operation setting data accompanying the above answer text. In other words, if the user has not operated the setting button 186, it is determined as "NO" in step S69, and the operation is ended directly. If the user has operated the setting button 186, it is determined as "YES" in step S69.

If it is determined as "YES" in step S69, in the next step S71, the CPU 12a extracts, from the answer data created in step S65, the operation setting data, and creates, in step S73, a set of operation setting data to be transmitted to be mobile terminal 16. At this time, the operation setting data that the user has already set to the image forming apparatus 14, which has been received in the previous step S61, may be included.

Then, in step S75, the operation setting data is transmitted to the mobile terminal 16. Thus, as explained earlier, in step S49 (FIG. 13), the operation setting data is transmitted from the mobile terminal 16 to the image forming apparatus 14.

According to the present first embodiment, a user asks a question from the mobile terminal 16 to the server 12 by means of a chatbot; answer data is returned to the mobile terminal 16 from the server 12; operation setting data accompanying the answer text is transmitted from the mobile terminal 16 to the image forming apparatus 14; and in the image forming apparatus 14, the operation setting data is set as the operation setting data 304g (FIG. 9). Accordingly, since the operation setting necessary for executing a job in the image forming apparatus is carried out by the chatbot, the trouble for the user can be reduced as much as possible. However, if one or more items of the operation setting data acquired from the chatbot duplicate the operation setting data already set by the user, either the operation data already set by the user or the operation data obtained from the chatbot is set according to the user's selection (FIG. 12, steps S11 to S15).

Second Embodiment

In an image processing system 10 of a second embodiment, the call center terminal 80 of FIG. 1 is used to chat with an operator, thereby acquiring an answer text for a question, and the accompanying operation setting data.

Figure 15:
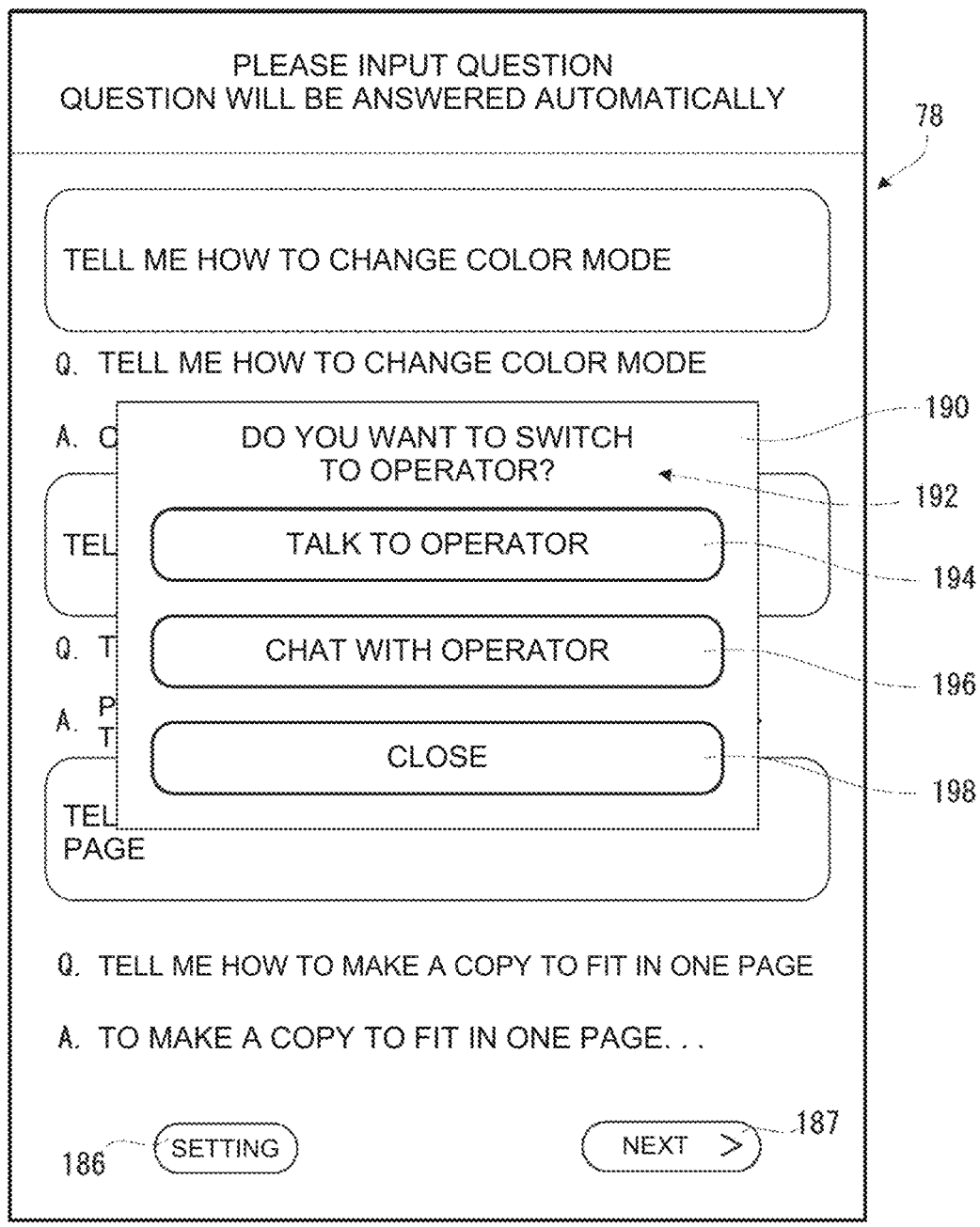
FIG. 15 is an illustrative view showing an example of a switching selection widow (switching selection screen) according to a second embodiment.

In a chatbot service, when a question that the chatbot cannot answer is raised or when a problem cannot be solved, an operator at a call center handles the question or the problem in place of the chatbot. For example, in a case where a user who does not at all know how to operate an image forming apparatus is to use the image forming apparatus, such as when the user takes a copy for the first time, or a case where use in combination of modes, although they are set to be unselectable by the user in advance, disables output of a normal copy, the user may ask a question as a result of trying to carry out the setting without knowing the prohibited setting and not understanding why the setting cannot be made. When a predetermined condition (switching condition) for switching to the operator handling in such circumstances is satisfied, as shown in FIG. 15, a switching selection window (a switching selection screen) 190 for switching to the operator handling is displayed on a display 78.

The switching condition corresponds to, for example, a state where the user remains in the periphery of an image forming apparatus 14 within a predetermined range therefrom, and none of the parts of the image forming apparatus 14 is operated continues for a predetermined time. Also, a chat screen 180 may be provided with an operation icon for switching to the operator handling (i.e., for displaying the switching selection window 190), and an operation on the operation icon may be set as the switching condition.

On the switching selection window 190, a notification text 192, a first selection icon 194, a second selection icon 196, and a close icon 198 are displayed (provided).

The notification text 192 is a message, such as "Do you want to switch to operator?", for prompting selection of whether the handling by the chatbot should be switched to the operator handing.

The first selection icon 194 is an operation icon for enabling a voice call with the operator. Although not illustrated, when the first selection icon 194 is operated, a call function is enabled, and a connection is automatically established with a call center talking device to realize a state in which the user and the operator at the call center can talk to each other.

When a connection is established between a mobile terminal 16 and the call center talking device, identification information on the mobile terminal 16 is displayed on a liquid crystal display of the call center talking device. The identification information on the mobile terminal 16 corresponds to, for example, a telephone number in the case of a voice call using a telephone line, or the name of the terminal or the user ID of a call application in the case of a voice call using a network 18. Consequently, the operator at the call center is able to identify the mobile terminal 16 connected to the call center talking device.

The second selection icon 196 is an operation icon for enabling a chat with the operator. Although not illustrated, when the second selection icon 196 is operated, the display 78 presents a screen for enabling a chat with the operator (i.e., for enabling a person-to-person chat), instead of the chat screen 180 displayed until then. Consequently, the user can interact with the operator by exchange of texts. Also, when the second selection icon 196 is operated, identification information on the mobile terminal 16 is transmitted to the call center terminal 80.

The close icon 198 is an operation icon for closing the switching selection window 190 (i.e., for not switching to the operator handling). When the close icon 198 is operated, the switching selection window 190 is closed (hidden from display), and the operation screen returns to that which has been displayed before the display of the switching selection window 190.

Figure 16:
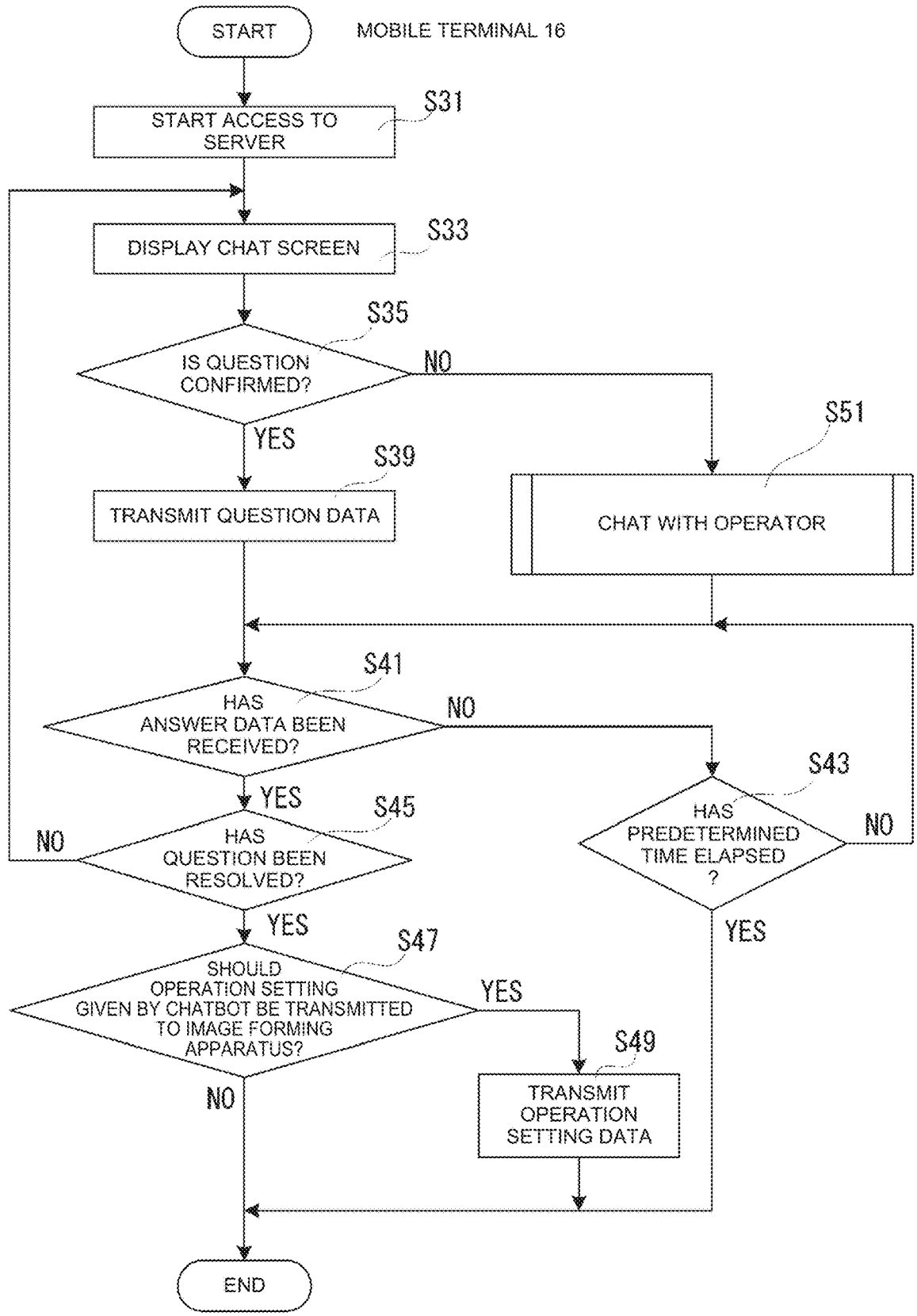
FIG. 16 is a flowchart showing an example of the operation of a mobile terminal shown in FIG. 3 according to the second embodiment.

Such a switching selection window 190 is displayed on the display 78 (FIG. 3) of the mobile terminal 16 in step S51 in a case where the user's question is not settled on the chat screen 180 (FIG. 7), i.e., when it is determined as "NO" in step S35 of FIG. 16, for example.

In step S51 mentioned above, it is determined, as indicated in FIG. 17, whether a switching condition for switching to the operator handling is satisfied, in the initial step S53. If it is "NO" in step S53, in other words, if it is determined that the switching condition is not satisfied, the chatbot service is ended.

Meanwhile, if it is "YES" in step S53, in other words, if it is determined that the switching condition is satisfied, in step S55, the switching selection window 190 (FIG. 15) is displayed on the display 78, and it is determined, in step S57, whether the handling should be switched to the operator handling. If it is "NO" in step S57, in other words, if it is determined that the handling is not to be switched to the operator handling, the processing proceeds to step S45.

Meanwhile, if it is "YES" in step S57, in other words, if it is determined that the handling is to be switched to the operator handling, in step S59, data of history transmission instruction (i.e., history transmission instruction data) is transmitted to a server 12, and thus history data is transmitted from the server 12 to the call center terminal 80.

Then, in step S60, switching to the operator handling (i.e., a voice call or a chat with the operator) is carried out.

After that, the user asks the operator a question via a voice chat, and the operator creates an answer text in text data by using an input device (not shown) such as a keyboard, and sends the answer text to the mobile terminal 16.

Then, the mobile terminal 16 executes the processing of step S41 and thereafter, and as a consequence, the answer text and the accompanying operation setting data are transmitted to the image forming apparatus 14 in step S49.

Also in the second embodiment, the user asks an operator at the call center terminal 80 a question by means of a chatbot; the operator returns answer data from the call center terminal 80 to the mobile terminal 16; operation setting data accompanying the answer text is transmitted from the mobile terminal 16 to the image forming apparatus 14; and in the image forming apparatus 14, the operation setting data is set as the operation setting data 304g (FIG. 9).

Third Embodiment

In the above-described embodiments, in step S21 of FIG. 12, when there exists operation setting data that has not yet been set, the image forming apparatus 14 is employed to set the operation setting data that has not yet been set. However, in a third embodiment, the operation setting for unset items is carried out on a mobile terminal 16.

In this case, an image forming apparatus 14 detects, in step S17, whether there exists an operation unset item needed to be set for completion of a job, and an unset portion is transmitted from the image forming apparatus 14 to the mobile terminal 16, so that the mobile terminal 16 is enabled to perform a digest display of the unset portion on a chatbot on the basis of the transmitted operation setting data, and carry out the operation setting. In this regard, the "digest display" means performing text display (simplifying) in light of the fact that if all of operation setting items of the image forming apparatus 14 are to be displayed on the chatbot, or more specifically, on a display 78 of the mobile terminal 16, the operation setting items would be hard to see for the user because the screen of the display 78 is so small.

In this way, if the unset portion is transmitted from the image forming apparatus 14 to the mobile terminal 16, and the mobile terminal 16 is employed to perform a digest display of the unset portion on the chatbot on the basis of the transmitted operation setting data, thereby enabling the setting to be made by the user, this configuration brings about an advantage of realizing more easily viewable display for the user than performing the display on a display of the image forming apparatus.

For example, generally, the following three items are provided as print condition settings for an image forming apparatus which is installed in a convenience store or the like, and setting items displayed as a text on the mobile terminal 16 are prompted to be simply selected.

Setting Items
1. Magnification: Same scale (100%), Enlargement (110%), Reduction (90%)
2. Print mode: Color/Monochrome
3. Paper size: A4/A3/Postcard In this case, when only the magnification is set, for example, the following two items are selectably displayed on the mobile terminal 16.

Unset Items
1. Print mode: Color/Monochrome
2. Paper size: A4/A3/Postcard

The user may check on the unset item, and select the desired setting.

However, even in a case where the unset items are to be set in the image forming apparatus 14, only the unset items may be displayed on a display 54 as described above.

Furthermore, when the user is prompted to set the unset item on the mobile terminal 16, a case where the user does not understand how to set the unset items may be assumed. However, in such a case, further questions may be asked via the chatbot.

In this way, if the user is informed of the unset items, and the unset items may be allowed to be set by the user if necessary, a job can be executed without fail by elimination of the unset items. Such an advantage can be similarly expected in the aforementioned embodiments which execute steps S21 to S23.

In the above-described embodiments, as a method of transmitting the operation setting data that has acquired through the chatbot from the mobile terminal 16 to the image forming apparatus 14, a method of performing the transmission by using short-range communication (NFC) or infrared communication may be adopted, apart from performing the transmission through the network 18.

Moreover, the operation setting data may be converted into a two-dimensional code image, and then transmitted from the mobile terminal 16 to the image forming apparatus 14. In this way, the amount of data to be communicated can be reduced.

Further, the specific configurations and the like exemplified in the above-described embodiments are merely examples, and can be changed as appropriate according to the actual product. Furthermore, the order of processing of the steps in the flowcharts illustrated in the above-described embodiments may be changed as appropriate as long as the same result can be obtained.

What is claimed is:

1. An image forming apparatus operation setting method in which a user accesses a chatbot from a mobile terminal to ask a question about an operation method for an image forming apparatus comprising a database including preregistered answers to assumable questions and operation setting data necessary for executing a job related to a question in the assumable questions that is associated with an answer in the preregistered answers, the image forming apparatus operation setting method comprising:

displaying a screen inducing to access the chatbot to ask the question;

receiving the answer to the question, having been asked through the screen, and operation setting data for the job related to the question, which are transmitted through the chatbot, from the mobile terminal;

receiving the operation setting data accompanying the received answer from the mobile terminal; and setting the operation setting data transmitted from the mobile terminal in the image forming apparatus.

2. The image forming apparatus operation setting method according to claim 1, further comprising:
   storing operation setting data set by the user;
   determining duplication between the operation setting data transmitted from the mobile terminal and the stored operation setting data set by the user; and
   setting, in an operation setting, unduplicated operation setting data.

3. The image forming apparatus operation setting method according to claim 2, further comprising selecting, after prompting the user to select, with respect to duplicated operation setting data, either the operation setting data transmitted from the mobile terminal or the stored operation setting data set by the user.

4. The image forming apparatus operation setting method according to claim 1, further comprising:
   detecting an unset item of the operation setting data to be applied for completing a job desired by the user in the image forming apparatus; and
   displaying the unset item and prompting the user to set the unset item.

5. The image forming apparatus operation setting method according to claim 4, wherein displaying the unset item comprises displaying the unset item on the mobile terminal so as to have the unset item set by the user.

* * * * *